United States Patent
Lin

(10) Patent No.: US 11,403,740 B2
(45) Date of Patent: Aug. 2, 2022

(54) METHOD AND APPARATUS FOR IMAGE CAPTURING AND PROCESSING

(71) Applicant: GUANGDONG OPPO MOBILE TELECOMMUNICATIONS CORP., LTD., Guangdong (CN)

(72) Inventor: Quanyou Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 284 days.

(21) Appl. No.: 16/834,030

(22) Filed: Mar. 30, 2020

(65) Prior Publication Data
US 2020/0327648 A1    Oct. 15, 2020

(30) Foreign Application Priority Data

Apr. 9, 2019   (CN) .......................... 201910280175.5

(51) Int. Cl.
*G06K 9/00*    (2022.01)
*G06T 5/00*    (2006.01)
(Continued)

(52) U.S. Cl.
CPC ............ *G06T 5/007* (2013.01); *G06T 1/0007* (2013.01); *G06T 5/50* (2013.01); *H04N 5/2355* (2013.01);
(Continued)

(58) Field of Classification Search
CPC ......... G06T 5/007; G06T 1/0007; G06T 5/50; G06T 2207/20081; G06T 2207/20084; G06T 5/002; G06T 2207/30201; G06T 2207/20208; G06T 2207/20221; H04N 5/2355; H04N 5/23219; H04N 5/23245; H04N 5/23258; H04N 5/2327;
(Continued)

(56) References Cited

U.S. PATENT DOCUMENTS

| 7,898,583 | B2 | 3/2011 | Wakahara et al. |
| 2002/0071048 | A1* | 6/2002 | Kaneda ................. H04N 5/238 348/E5.04 |

(Continued)

FOREIGN PATENT DOCUMENTS

| CN | 104869297 A | 8/2015 |
| CN | 106060249 A | 10/2016 |

(Continued)

OTHER PUBLICATIONS

Zijian Zhu, High Quality High Dynamic Range Imaging, Dissertations in Forestry and Natural Sciences, Aug. 7, 2013.

(Continued)

*Primary Examiner* — Andrew M Moyer
(74) *Attorney, Agent, or Firm* — Young Basile Hanlon & MacFarlane, P.C.

(57) ABSTRACT

A method and an apparatus for image processing are provided. An original image is captured. At least one reference image is generated by adjusting brightness of the original image. Multiple denoised images are generated by performing artificial intelligence based denoising on the original image and the at least one reference image respectively. A target image is generated by performing HDR synthesis on the multiple denoised images.

18 Claims, 19 Drawing Sheets

(51) Int. Cl.
*G06T 1/00* (2006.01)
*G06T 5/50* (2006.01)
*H04N 5/235* (2006.01)

(52) U.S. Cl.
CPC ............... *G06T 2207/20081* (2013.01); *G06T 2207/20084* (2013.01)

(58) Field of Classification Search
CPC .... H04N 5/2351; H04N 5/2353; H04N 5/357; H04N 5/23222; H04N 5/23232; G06V 40/161; G06V 10/30; G06V 10/82; G06K 9/6273
See application file for complete search history.

(56) References Cited

U.S. PATENT DOCUMENTS

| | | | | |
|---|---|---|---|---|
| 2007/0147701 | A1* | 6/2007 | Tanaka | H04N 5/23219 348/E5.038 |
| 2011/0102621 | A1* | 5/2011 | Kim | H04N 5/232945 348/222.1 |
| 2013/0208139 | A1* | 8/2013 | Lin | H04N 5/235 348/229.1 |
| 2013/0301928 | A1 | 11/2013 | Springer et al. | |
| 2014/0177908 | A1 | 6/2014 | Shieh et al. | |
| 2017/0034414 | A1* | 2/2017 | Wang | H04N 5/23254 |
| 2017/0366725 | A1* | 12/2017 | Chen | H04N 5/23206 |
| 2018/0293711 | A1 | 10/2018 | Vogels et al. | |
| 2018/0357537 | A1* | 12/2018 | Munkberg | H04N 5/232945 348/222.1 |

FOREIGN PATENT DOCUMENTS

| | | | | |
|---|---|---|---|---|
| CN | 107103588 | A | 8/2017 | |
| CN | 107194884 | A | 9/2017 | |
| CN | 107623818 | A | 1/2018 | |
| CN | 107635098 | A | 1/2018 | |
| CN | 108280811 | A * | 7/2018 | ............ G06T 5/002 |
| CN | 108280811 | A | 7/2018 | |
| CN | 105323459 | B | 10/2018 | |
| CN | 108616689 | A | 10/2018 | |
| CN | 108683861 | A | 10/2018 | |
| CN | 109146824 | A | 1/2019 | |
| CN | 109151333 | A | 1/2019 | |
| CN | 109218613 | A | 1/2019 | |

OTHER PUBLICATIONS

Indian Examination Report for IN Application 202014013396 dated Sep. 10, 2021. (6 pages).
China Second Office Action with English Translation for CN Application 201910280175.5 dated Feb. 10, 2021. (52 pages).
English Translatoin of the First Office Action issued in corresponding CN application No. 201910280175.5 dated Jun. 28, 2020.
International search report issued in corresponding international application No. PCT/CN2020/080933 dated Jun. 30, 2020.
Extended European search report issued in corresponding European application No. 20167132.8 dated Sep. 4, 2020.
Jae Sung Park et al: "Generation of High Dynamic Range illumination from a Single Image for the Enhancement of Undesirably Illuminated Images", dated Aug. 2, 2017.
Janne Mustaniemi et al: "LSD2-Joint Denoising and Deblurring of Short and Long Exposure Images with Convolutional Neural Networks", dated Nov. 23, 2018.

* cited by examiner

METHOD AND APPARATUS FOR IMAGE CAPTURING AND PROCESSING

CROSS-REFERENCE TO RELATED APPLICATION(S)

This application claim priority to Chinese Patent Application No. 201910280175.5, filed on Apr. 9, 2019, the disclosure of which is hereby incorporated by reference in its entirety.

TECHNICAL FIELD

This disclosure relates to the technical field of imaging, and particularly to a method and an apparatus for image processing.

BACKGROUND

With the development of science and technology, camera technology relying on science and technology has become more and more mature. In daily life, it has become a normal practice to use built-in cameras of smart mobile terminals (e.g., smartphones, tablet PCs, etc.) to take pictures. With the diversification of photographic needs, how to better meet photographic needs of users has become an important develop direction, for example, how to take clear pictures in scenarios at night and day.

In the related art, in order to make up for shortcomings that one image is unable to reveal clearly every detail in the image, high dynamic range (HDR) technology is used for taking pictures. According to HDR, multiple images are captured at different exposure times and then blended to provide more dynamic ranges and image details.

The above-mentioned HDR, however, on the one hand, cannot guarantee that the camera does not shake when capturing multiple images. Once there is a shake, misalignment may occur in a blended image and result in "image ghosting". On the other hand, capturing multiple images leads to a lower imaging efficiency and affects photography experience.

SUMMARY

In an aspect, a method for image processing is provided. The method includes the follows. An original image is captured. At least one reference image is generated by adjusting brightness of the original image. Multiple denoised images are generated by performing artificial intelligence-based (AI-based) denoising on the original image and the at least one reference image respectively. A target image is generated by performing HDR synthesis on the multiple denoised images.

In another aspect, an electronic device is provided. The electronic device includes an image sensor, a processor coupled with the image sensor, and a memory configured to store computer programs. The processor includes an image signal processing (ISP) processor and a graphic processing unit (GPU) coupled with the ISP processor. The computer programs, when executed by the processor, cause: the ISP to control the image sensor to capture an original image, the GPU to generate at least one reference image by adjusting brightness of the original image; the GPU to generate the a plurality of denoised images by performing artificial intelligence-based (AI-based) denoising on the original image and the at least one reference image respectively; the ISP processor to generate a target image by performing high dynamic range (HDR) synthesis on the plurality of denoised images.

In another aspect, an image processing circuit is provided. The image processing circuit includes an image signal processing (ISP) processor and a graphic processing unit (GPU). The ISP is electrically coupled with an image sensor and configured to control the image sensor to obtain an original image and generate a target image by performing HDR synthesis on multiple denoised images corresponding to the original image and at least one reference image. The GPU is electrically coupled with the ISP processor and configured to generate the multiple denoised images by performing AI-based denoising on the original image and the at least one reference image respectively.

BRIEF DESCRIPTION OF DRAWINGS

The above and/or additional aspects and advantages of the disclosure become more apparent and easily understood from the following description of implementations with reference to the accompanying drawings, in which.

DETAILED DESCRIPTION

Figure 1:
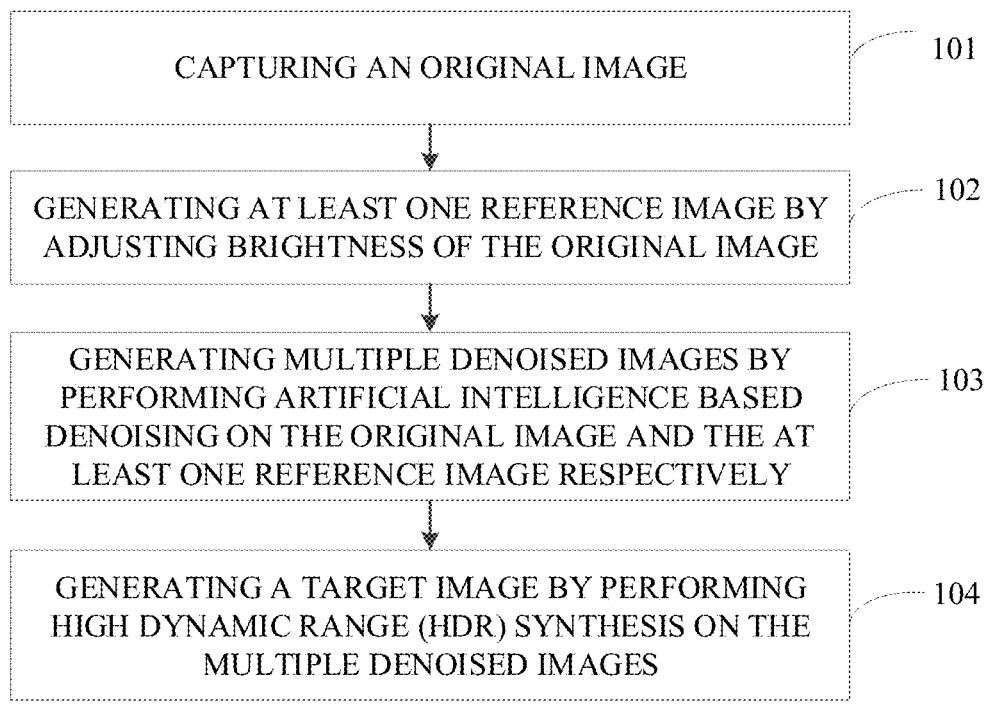
FIG. 1 is a schematic flow chart illustrating a method for image processing according to at least one implementation.

Implementations are described in the following in detail. Examples of the implementations are illustrated in the accompanying drawings, in which like or similar reference numerals represent like or similar elements or elements with like or similar functions. The implementations described below with reference to the accompanying drawings are merely examples for illustrative purpose only rather than limiting the disclosure.

Implementations of the present disclosure provide a method and an apparatus for image processing, to solve the technical problem that image processing based on high dynamic range (HDR) technology has a "ghosting" effect and low image processing efficiency.

In view of the technical problem mentioned in the background that high dynamic range (HDR) based photography technology in the related art may lead to misalignment and thus "ghosting" effect as well as low shoot efficiency, the present disclosure proposes an optimized method for image processing. According to the method of the present disclosure, on one hand, the number of original images captured is reduced and shoot efficiency is improved. On the other hand, since multiple reference images are generated from an original image, there is no misalignment between the original image and the reference images, which avoids the "ghosting" effect and improves quality such as purity of an image finally obtained.

To facilitate understanding of the disclosure, technical terms involved herein are given below before describing the method for image processing of implementations.

Camera shake ("shake" for short): refers to a movement of a camera relative to a scene when the camera captures multiple images of the scene.

Exposure amount ("exposure" for short): also known as exposure value (EV). According to the original definition of exposure value, the exposure value refers to "all combinations of aperture and exposure time that can give the same exposure" rather an exact value. Light sensitivity, aperture, and exposure time define exposure of a camera. Different combinations of these parameters may result in a same exposure, that is, exposure values corresponding to the different combinations are the same. For example, with the same sensitivity, a combination of exposure time of 1/125 second and aperture of F/11 and a combination of exposure time of 1/250 second and shutter of F/8.0 result in a same exposure, i.e., the same EV. "EV=0" (0EV) refers to the exposure obtained with sensitivity of 100, aperture of F/1, and exposure time of 1 second. The EV is increased by 1 (1EV) when the exposure is increased by one level, that is, when the exposure time is doubled, or the sensitivity is doubled, or the aperture is increased by one level. In other words, the exposure corresponding to 1EV is twice the exposure corresponding to 0EV. TABLE 1 illustrates a correspondence between EV and the exposure time, aperture, or sensitivity respectively.

TABLE 1

| Correspondence between exposure time and EV when aperture = F/1.0 and sensitivity = 100 | | | | | | | | | | | |
| --- | --- | --- | --- | --- | --- | --- | --- | --- | --- | --- | --- |
| exposure time/second | 1 | 1/2 | 1/4 | 1/8 | 1/15 | 1/30 | 1/60 | 1/125 | 1/250 | 1/500 | 1/1000 |
| EV | 0 | 1 | 2 | 3 | 4 | 5 | 6 | 7 | 8 | 9 | 10 |
| Correspondence between aperture and EV when exposure time = 1 second and sensitivity = 100 | | | | | | | | | | | |
| aperture | F/1.0 | F/1.4 | F/2.0 | F/2.8 | F/4.0 | F/5.6 | F/8.0 | F/11 | F/16 | F/22 | F/32 |
| EV | 0 | 1 | 2 | 3 | 4 | 5 | 6 | 7 | 8 | 9 | 10 |
| Correspondence between sensitivity and EV when exposure time = 1 second and aperture = F/1.0 | | | | | | | | | | | |
| sensitivity | 100 | 200 | 400 | 800 | 1600 | 3200 | 6400 | / | / | / | / |
| EV | 0 | 1 | 2 | 3 | 4 | 5 | 6 | / | / | / | / |

As the photography technology enters the digital times, light metering function inside the camera has become very powerful. "EV" typically represents differentials on the exposure scale. Many cameras allow to set exposure compensation, which is usually denoted by EV. In this case, EV refers to a difference between an exposure corresponding to a result of light metering of a camera ("light metering result" for short) and an actual exposure. For instance, exposure compensation of "+1EV" refers to increase exposure by one level with respect to the exposure corresponding to the light metering result, that is, the actual exposure is twice the exposure corresponding to the light metering result.

In implementations, the EV corresponding to a determined reference exposure can be preset to 0.+1EV means increase the exposure by one level, i.e., the exposure is twice the reference exposure; +2EV means increase the exposure by two levels, i.e., the exposure is four times the reference exposure; −1EV means decrease the exposure by one level, i.e., the exposure is half of the reference exposure, and so on.

For example, if multi-frame images includes seven frames, an EV range corresponding to a preset exposure compensation strategy can be [+1, +1, +1, +1, 0, −3, −6]. A frame corresponding to an exposure compensation strategy of +1EV may solve noise problem. By performing denoising in time domain on the frame with higher brightness, the noise can be suppressed while improving shadow details. A frame corresponding to an exposure compensation strategy of −6EV can solve overexposure problem (blown-out highlight) while preserving highlight details. Frames corresponding to exposure compensation strategies of 0EV and −3EV can be used to maintain transition between highlights and shadows, so as to keep a good transition-effect between light and dark parts.

Shadows (commonly known as deep dark areas) are the darkest areas of a photograph or an image. A shadow is also devoid of color, it could be the black in a photograph or just the areas that carry little light. An image with too many shadows may be underexposed, and will not show much detail, this can however normally be adjusted. Highlights are the opposite of shadows. They are created by way of intense illumination through different types of reflection or diffusion. Any bright light source is capable of creating a highlight, although it can sometimes depend on the size and intensity of the source.

A method and an apparatus for image processing of implementations are described below with reference to the accompanying drawings.

FIG. 1 is a schematic flow chart illustrating a method for image processing according to at least one implementation. As illustrated in FIG. 1, the method beings at block 101.

At block 101, an original image is captured.

For example, the original image can be one image or multiple images. When the original image is embodied as multiple images, the number of the multiple images should be less than the number of images required in HDR imaging in the related art. As such, the number of original images required to be captured is reduced and a speed at which images are captured ("shooting speed") is improved. The shooting speed can be further improved especially when only one image is required to be captured. Implementations of the present disclosure will be described mainly for the case where the number of original image is one.

In order to obtain from a minimum number of original images a final image that can preserve more image details, the quality of the original image captured should be ensured, that is, ensure that the original image is properly exposed. The original image can be obtained by shooting, that is, the original image is captured at the initial moment of shooting. Alternatively, the original image can be retrieved from a memory. In such case, the image stored in the memory or otherwise can be one or more images, which is not limited herein. The following describes an example where one original image is captured.

FIRST EXAMPLE

In this example, an ambient light intensity is obtained when capturing the original image. For example, the ambient light intensity is determined based on an intensity detected by a light sensor. For another example, the ambient light intensity is determined according to sensitivity parameters such as an ISO value. Further, an initial exposure is determined based on the ambient light intensity and the original image is captured according to the initial exposure. It can be understood that the original image is captured with an initial exposure which can preserve more image details under the ambient light intensity. In other words, the initial exposure is not limited to the above-mentioned reference exposure, but can be determined in such a way that more images details can be preserved under the current ambient light intensity. That is, the initial exposure can be any of EV−, EV0, and EV+.

In this example, three threshold intensities can be constructed according to a large number of experiments, that is, a first threshold intensity, a second threshold intensity, and a third threshold intensity. The first threshold intensity is smaller than the second threshold intensity. The second threshold intensity is smaller than the third threshold intensity. The first threshold intensity may correspond to a darker scene such as at night. The second threshold intensity may correspond to a scene of less brightness, such as at dusk or in the morning. The third threshold intensity may correspond to a brighter scene, such as under the light. Further, the initial exposure can be preset to three levels, that is, a first exposure, a second exposure, and a third exposure. The first exposure is smaller than the second exposure. The second exposure is smaller than the third exposure. For example, the first exposure is EV−, the second exposure is EV0, and the third exposure is EV+.

When the ambient light intensity is lower than or equal to the first threshold intensity, the initial exposure is determined as the first exposure. That is, in the darker scene, the original image is captured with less exposure. In this way, detail-loss will not occur to highlight regions even if there is over-exposure. It should also be noted that shooting with the first exposure, that is, with less exposure, can save shooting time, which further improve efficiency of image processing.

When the ambient light intensity is higher than the first threshold intensity but lower than or equal to the second threshold intensity, the initial exposure is determined as the second exposure. That is, in the scene of less brightness, the original image is captured with reference exposure. In this way, a great number of details in the original image can be preserved.

When the ambient light intensity is higher than the second threshold intensity, the initial exposure is determined as the third exposure. That is, in the brighter scene, the original image is captured with higher exposure. In this way, detail-loss will not occur to shadows even if there is under-exposure.

SECOND EXAMPLE

Based on the first example, to take into account a face region in the image and further improve user experience of shooting, whether a preview image contains a face region can be detected. The "face region" used herein refer to a region in which a facial image is contained. If the preview image contains the face region, a portrait mode will be determined according to the ambient light intensity. For example, when the ambient light intensity corresponds to a daytime portrait mode, a value of exposure adjustment corresponding to the daytime portrait mode can be determined, and the initial exposure obtained in the first example can be adjusted according to the value of exposure adjustment. In this way, not only the details of the whole image can be preserved, but also the quality of details in the face region are also taken into account. In this example, the value of exposure adjustment can be preset and stored according to hardware parameters and shooting modes.

For instance, when the initial exposure is determined as EV−5 according to the ambient light intensity, and it is detected that the preview image contains the face region, the shooting mode can be determined as a night portrait mode according to the ambient light intensity. The face region is brighter than other regions under the night portrait mode, and more highlight details can be preserved when less exposure is adopted. In this regard, The exposure can thus be reduced by 0.5 (the value of exposure adjustment). The initial exposure can be adjusted to EV−5.5.

At block 102, at least one reference image is generated by adjusting brightness of the original image.

In implementations, rather than taking multiple images required for HDR imaging, the reference image is generated from the original image by adjusting the brightness of the original image. In this way, during alignment, the reference image and the original image will not be misaligned, and thus purity of the synthesized image can be guaranteed. Since the reference image is generated by adjusting the brightness of the original image, the reference image and the original image thus have different brightness. Therefore, regions with different brightness in the image can be clearly presented.

Figure 2:
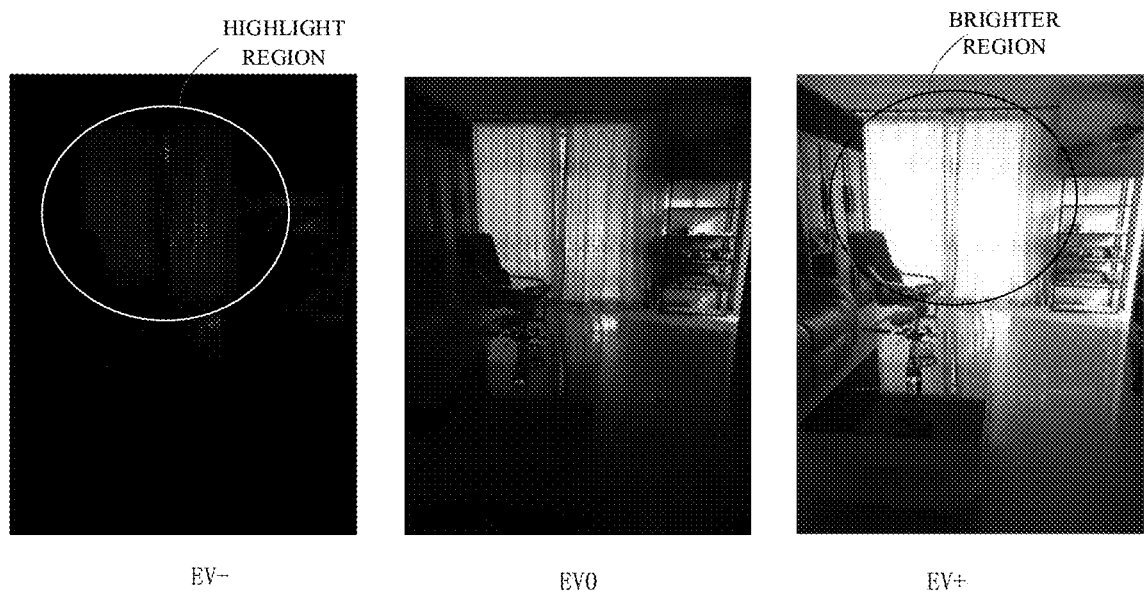
FIG. 2 is a schematic diagram illustrating an application scenario of a first method for image processing according to at least one implementation.

In different shooting scenes, brightness required for the reference image is different. For example, when the original image is captured in a night mode, an initial exposure corresponding to the original image is EV−. In the night mode, most scenes are under-exposed. As illustrated in the left-hand figure of FIG. 2, in the original image, only highlight regions are subjected to a proper exposure and highlight details are preserved. If the brightness of the original image is adjusted in such a manner that it corresponds to a reference exposure EV0, then as illustrated in the middle of FIG. 2, image details in darker and brighter regions are preserved. If the brightness of original image is adjusted in such a manner that it corresponds to a higher exposure EV+, then as illustrated in the right-hand figure of FIG. 2, image details in the brighter regions are over-exposed and image details in the darker regions are revealed.

At block 103, multiple denoised images are generated by performing artificial intelligence-based (AI-based) denoising on the original image and the at least one reference image respectively.

In photography, an image sensor in an electronic device can be subjected to various photo-electromagnetic interference from periphery circuits and between pixels, so that the original image captured inevitably has noise. For example, in the night mode, the original image is generally captured with larger aperture and longer exposure time. Here, if higher sensitivity adopted to reduce exposure time, there must be noise in the original image captured. Also, sharpness of the original image varies with the degree of interference. Therefore, there must be noise in the reference image accordingly. Denoising are required for the original image and the reference image.

In one example, AI-based denoising is adopted. The AI-based denoising is based on noise characteristic. In implementations, the noise characteristic can be statistical characteristic of random noise induced by the image sensor. The noise herein mainly includes thermal noise and shot noise. The thermal noise fits Gaussian distribution and the shot noise fits Poisson distribution. The statistical characteristic herein refers to variance of noise or other possible values, which is not limited herein. Since denoising is performed based on the noise characteristic, noises corresponding to different noise characteristic can be denoised differently, make a denoised image thus obtained more realistic and preserve more dynamic information. Compared with a conventional denoising method such as a interpolation method, according to the method provided herein, it is possible to distinguish between different noises and adopt different denoising methods for the different noises, as such, a more vivid denoised image can be obtained.

In at least one implementation, a neural network model is pre-trained, where the neural network model has learned a mapping relationship between sensitivity and noise characteristic, specifically, sensitivity and noise characteristic of the original image and the at least one reference image. The sensitivity is also known as ISO value, which is an index that measures the sensitivity of negatives to light. The lower the ISO value, the higher the quality of an image captured and the finer the image details. Further, the higher ISO value, the higher the light-sensitivity, which means more light can be received and thus more heat can be generated. Therefore, higher sensitivity may introduce more noise, leading to a reduced image quality. That is, the ISO value and the noise characteristic are closely related. Since the reference image is not obtained by shooting and no ISO value adjustment occurs, the ISO value of the reference image can be calculated according to the pixel brightness of the reference image.

Figure 3:
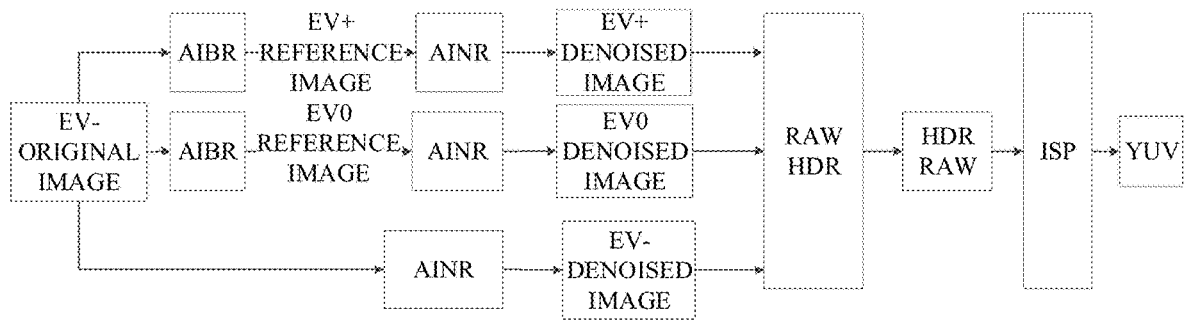
FIG. 3 is a schematic diagram illustrating an application scenario of a second method for image processing according to at least one implementation.

In at least one implementation, the neural network model is trained with sample images corresponding to different sensitivity until a noise characteristic recognized by the neural network model matches a noise characteristic identified in a corresponding sample image. That is, there are multiple ambient light intensities, and for each ambient light intensity, multiple frames of images which are captured with different sensitivity are used as the sample images. In order to obtain a more accurate result of noise characteristic recognition, the ambient light intensities and the ISO values can be sub-divided, and the number of frames of the sample images can be increased, such that the neural network can recognize accurately statistical characteristic of an HDR synthesized image after the HDR synthesized image is input into the neural network model. With reference to FIG. 3, the neural network model above and the denoising function can be integrated into one single model, which can be an AI noise reduction (AINR) model for denoising.

After capturing, at different ambient light intensities, the sample images corresponding to different sensitivities, the neural network model is trained with the sample images. The statistical characteristic identified in the sample images are used as a characteristic for model training, the sample images identified with statistical characteristic are input into the neural network model, so as to train the neural network model to recognize the statistical characteristic of the sample images. It should be noted that the neural network model is merely one possible implementation to achieve AI-based denoising. In practice, the AI-based denoising can be achieved in any other possible manners. For example, it can be achieved by conventional programming (e.g., a simulation method and an engineering method). For another example, it can be achieved by a genetic algorithm and an artificial neural network based method.

It should be noted that, the statistical characteristic is identified in the sample images to train the neural network model, the reason is, the sample images identified with statistical characteristic can clearly indicate the position and type of the noise in the sample images. Therefore, when the identified statistical characteristic is used as a characteristic for model training, the statistical characteristic of the synthesized image can be recognized after the synthesized image is input into the neural network model.

With the neural network model, noise characteristic recognition is performed on the original images and the at least one reference image respectively. According to the noise characteristic recognized, denoising is performed on the original image and the at least one reference image to obtain the multiple denoised images.

At block 104, a target image is generated by performing HDR synthesis on the multiple denoised images.

With reference to FIG. 3, average pixel brightness of the original image is relatively low, and the initial exposure is EV−. The exposure compensation amounts corresponding to brightness adjustment of the reference image are determined as EV+ and EV0. After obtaining the multiple denoised images, HDR synthesis is performed on the multiple denoised images to generate the target image. The target image has a high purity and rich details. As an example, the target image is obtained by performing the HDR synthesis on the multiple denoised images. As another example, the target image is obtained by performing direct synthesis on the multiple denoised images.

In at least one implementation, a display of an electronic device can process an image in YUV format, where a brightness signal of the image is marked as Y, and a chrominance signal is composed of two independent signals. Depending on different color systems and formats, this two kinds of chrominance signals are usually marked as U and V. In this regard, after obtaining all the denoised images in RAW format, as illustrated in FIG. 3, format conversion can be performed on all the denoised images through an image signal processor (ISP), which converts the denoised images in RAW format into denoised images in YUV format. Due to the limited size of the display screen, to achieve a better preview effect, the denoised images in YUV format can be compressed to a preview size for display.

The original image and the reference image are different in terms of exposure and image details revealed. Each image has different clearer regions. As illustrated in FIG. 2, the right-hand figure presents clearly very dark regions, while the figure in the middle presents clearly the brighter regions and darker regions. Therefore, in HDR synthesis, if weights of the brighter regions and darker regions in the figure in the middle as well as the weight of the very dark regions in the right-hand figure can be increased, proper exposure can be achieved in respective regions of the image and image quality can be improved.

As a result, in at least one implementation, the multiple denoised images are input into an HDR synthesis model and synthesis weights for respective regions of the original image are obtained. The HDR synthesis model has learned a mapping relationship between characteristics of the respective regions and the synthesis weights. The characteristics is indicative of exposure and brightness of corresponding image regions. HDR synthesis is performed on the multiple denoised images per region according to the synthesis weights to generate the target image.

Further, in order to optimize the method for image processing continuously, the result of image processing can be fed back to the neural network model to optimize corresponding parameters. In at least one implementation, after the target image is obtained, multiple reference pixels in the target image are determined, a difference of pixel grayscale between multiple reference pixels is calculated according to a preset gradient function, and when the difference of pixel grayscale is greater than a preset threshold, corresponding parameters of the neural network model are modified.

In summary, according to the method for image processing, the original image is captured. The at least one reference image is generated by adjusting brightness of the original image. The multiple denoised images are generated by performing AI-based denoising on the original image and the at least one reference image respectively. Further, the target image is generated by performing HDR synthesis on the multiple denoised images. In this way, by using the AI-based denoising, the image purity can be guaranteed and more image details can be preserved. Moreover, since the images used for synthesis are all derived from the original image, the ghosting effect in the target image synthesized due to misalignment can be avoided. Additionally, the reference image is obtained by adjusting brightness of the original image rather than shooting, so that imaging efficiency of the target image can be improved.

According to the implementations above, with more gradients in brightness adjustment of an image, the obtained reference image can show image details more comprehensively. However, in some scenes, for example in dark environments, using under-exposure compensation amount contributes less to revealing of image details. On the other hand, in bright environments, using over-exposure compensation amount contributes less to revealing of image details. Accordingly, in implementations, to improve efficiency of image processing, a scheme for brightness adjustment of the reference image is determined based on the brightness of the original image.

Figure 4:
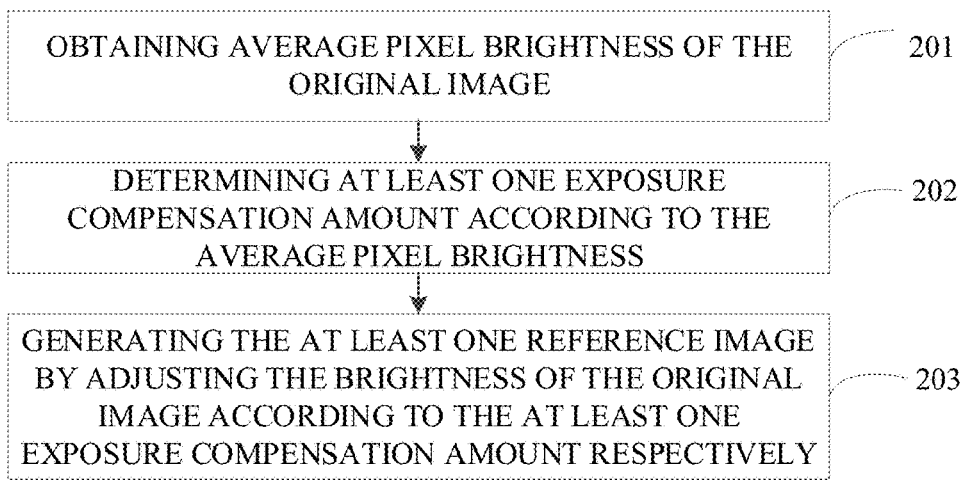
FIG. 4 is a schematic flow chart illustrating another method for image processing according to at least one implementation.

As a first example, as illustrated in FIG. 4, operations at block 102 begin at block 201.

At block 201, average pixel brightness of the original image is obtained.

At block 202, at least one exposure compensation amount is determined according to the average pixel brightness.

At block 203, the at least one reference image is generated by adjusting the brightness of the original image according to the at least one exposure compensation amount respectively.

Pixel brightness of each pixel in the original image is obtained, and the average pixel brightness of the original image is calculated based on the pixel brightness. The at least one exposure compensation amount is determined according to the average pixel brightness, where the exposure compensation amount is set based on a reference sensitivity. For example, when the exposure compensation amount corresponding to the reference sensitivity is EV0, which is the most appropriate exposure determined according to the average pixel brightness of a preview image, the exposure compensation amount can be set in a range from EV−5 to EV−1 and a range from EV+1 to EV+5. Further, the at least one reference image is generated by adjusting the brightness of the original image according to the at least one exposure compensation amount respectively.

Figure 5A:
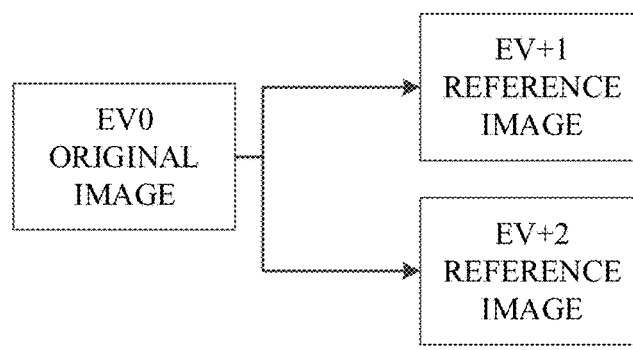
FIG. 5A is a schematic diagram illustrating an application scenario of a third method for image processing according to at least one implementation.

In implementations, the exposure compensation amount required for preserving more image details is determined according to overall brightness of the original image. For example, as illustrated in FIG. 5A, when the average pixel brightness of the original image is very low and the initial exposure is EV0, it indicates that the image mainly contains very dark regions. For this reason, over-exposed reference images can be used to recover image details. Consequently, as illustrated in FIG. 5A, the determined exposure compensation amounts are EV+1 and EV+2, and the original image is brightened based on EV+1 and EV+2 to obtain corresponding reference images.

Figure 5B:
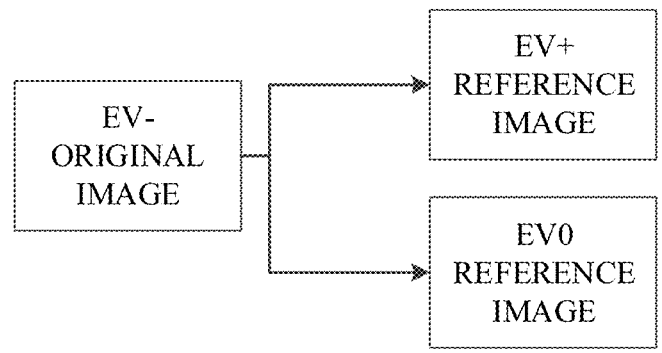
FIG. 5B is a schematic diagram illustrating an application scenario of a fourth method for image processing according to at least one implementation.

For another example, as illustrated in FIG. 5B, when the average pixel brightness of the original image is relatively low, and the initial exposure is EV−, it indicates that the image was captured in a scene mainly has darker areas. For this reason, normal-exposed or slightly over-exposed reference images can be used to recover image details. Consequently, as illustrated in FIG. 5B, the determined exposure compensation amounts are EV+ and EV0, and the original image is brightened based on EV+ and EV0 to obtain corresponding reference images.

Figure 5C:
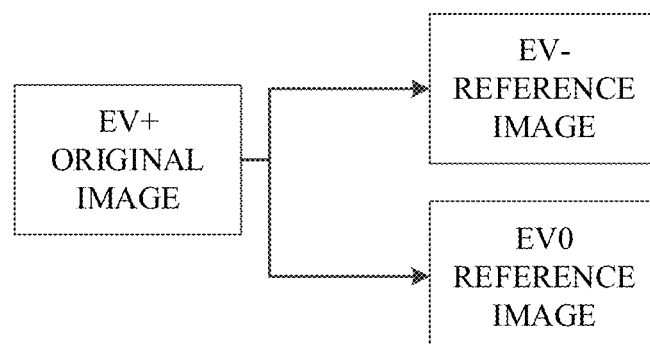
FIG. 5C is a schematic diagram illustrating an application scenario of a fifth method for image processing according to at least one implementation.

For another example, as illustrated in FIG. 5C, when the average pixel brightness of the original image is relatively high, and the initial exposure is EV+, it indicates that the image was captured in a scene mainly has brighter areas. For this reason, normally-exposed or slightly under-exposed reference images can be used to recover image details. Consequently, as illustrated in FIG. 5C, the determined exposure compensation amounts are EV− and EV0, and the original image is brightened based on EV− and EV0 to obtain corresponding reference images.

Figure 5D:
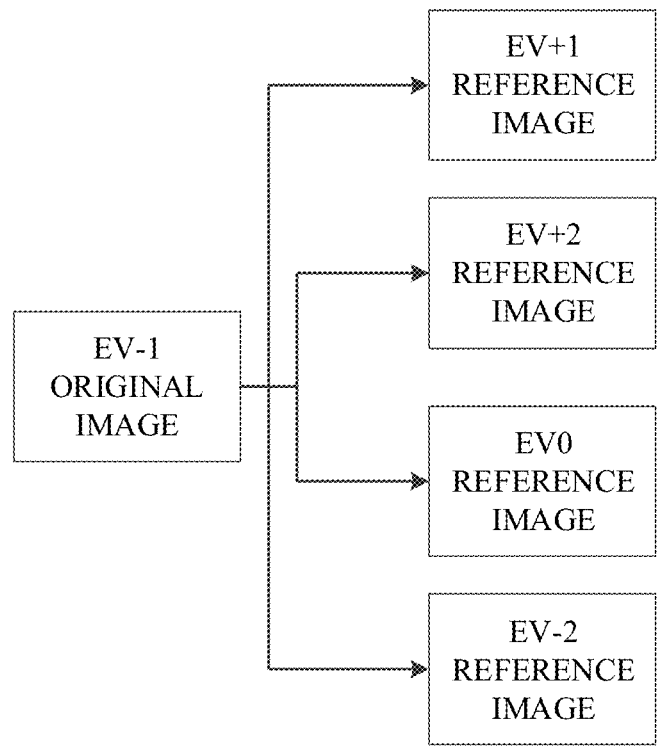
FIG. 5D is a schematic diagram illustrating an application scenario of a sixth method for image processing according to at least one implementation.

For another example, as illustrated in FIG. 5D, when the average pixel brightness of the original image is at general level, and the initial exposure is EV−1, it indicates that the image was captured in a scene mainly has areas with average brightness and the number of highlights and shadows in the image is similar. For this reason, fully-exposed reference images can be selected to recover image details. Consequently, as illustrated in FIG. 5D, the determined exposure compensation amounts are EV+1, EV+2, EV−2, and EV0, and the original image is brightened based on EV+1, EV+2, EV−2, and EV0 to obtain corresponding reference images.

It can be known from the description that the reference image and the original image are different in terms of brightness, and image details in different regions are revealed clearly. The reference images is equivalent to that captured at different exposures. However, for the reference images, algorithm processing is applied to achieve presentation of shooting effects as that achieved with different exposures. As an example, an AI based brightness enhancement (AIBR) model can be preset. The brightness enhancement model may perform brightness adjustment corresponding to a target compensation amount according to pixel brightness and noises of the original image. Instead of forcibly brightening the image, which may cause the image lose sense of motion, this model can preserve more image details under the premise that the original image is brightened to a shooting effect which can be obtained at a corresponding exposure. Parameters of the brightening model are adjusted in respect of each exposure compensation amount, such that the brightening model may output an reference image that has the shooting effect of a corresponding exposure.

In this example, the parameters of the brightening model are adjusted to obtain at least one AI-based brightening models, each of which corresponds to one of the at least one exposure compensation amount respectively. The original image is input into each of the multiple brightening models corresponding to each of the at least one exposure compensation amount respectively, to obtain corresponding reference images. Taking the scenario shown in FIG. 5B as an example, as illustrated in FIG. 3, the original image is input into brightening models corresponding to EV+ and EV0, and corresponding reference images are obtained.

Figure 6:
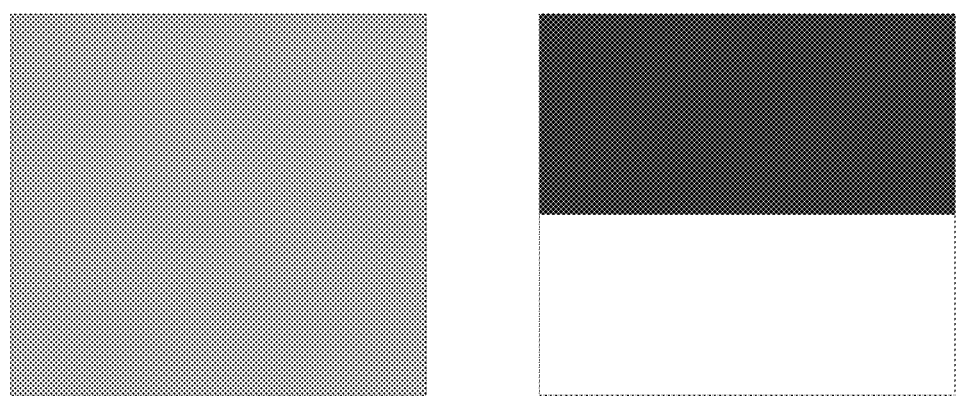
FIG. 6 is a schematic diagram illustrating an application scenario of a seventh method for image processing according to at least one implementation.

In some cases, average pixel brightness of two original images can be the same, but distribution of highlights and shadows (that is, bright and dark regions) can be different. For example, some original images may have normal average pixel brightness, but the highlights and shadows are remarkably different. As illustrated in FIG. 6, in which gray values represent the degree of darkness, the average pixel brightness of both figures is the same, which may lead to a same strategy for obtaining reference image(s). However, in the right-hand figure, the highlights and shadows are remarkably different. Apparently, if reference image(s) are obtained for the image in the right-hand figure based on a determination that the right-hand figure has normal average pixel brightness, the reference image(s) may loses details of the highlights and shadows in the original image.

Figure 7:
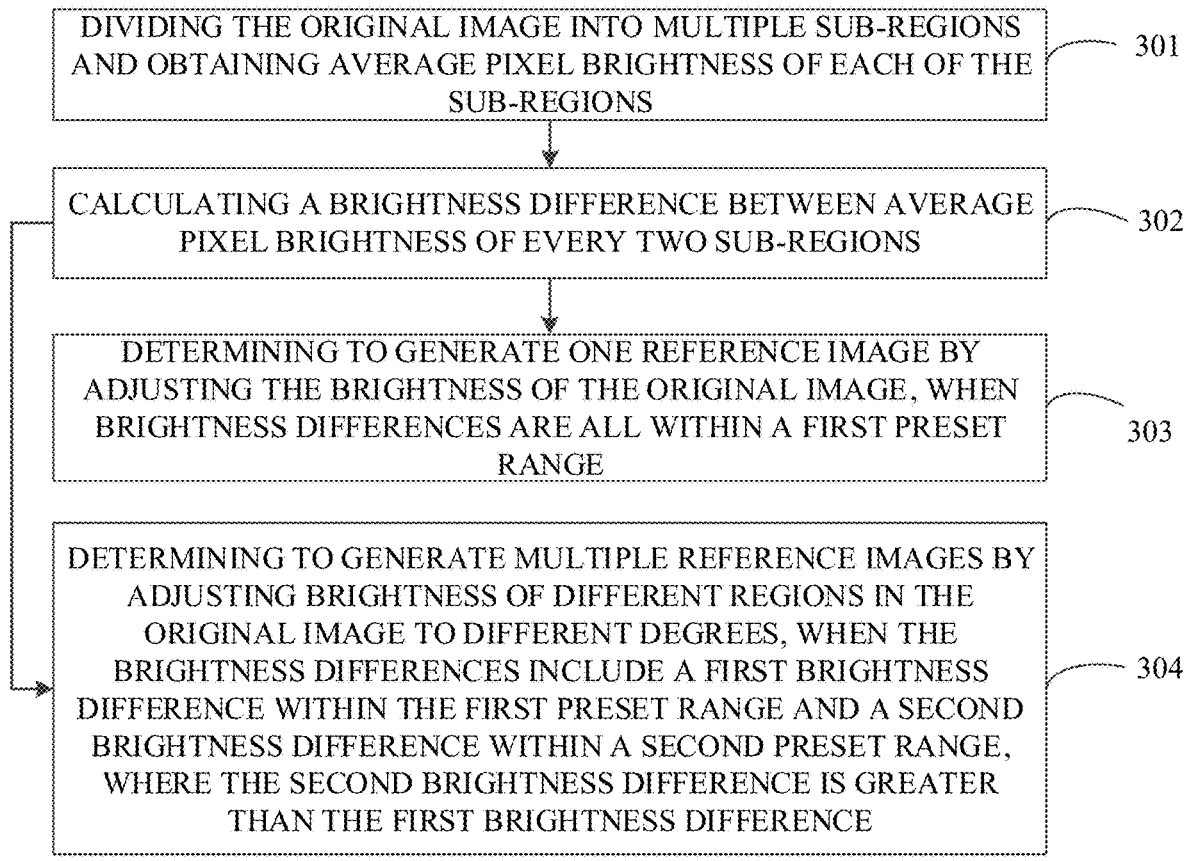
FIG. 7 is a schematic flow chart illustrating another method for image processing according to at least one implementation.

To take into account more image details, as a second example, as illustrated in FIG. 7, operations at block 102 begin at block 301.

At block 301, the original image is divided into multiple sub-regions and average pixel brightness of each of the sub-regions is obtained.

At block 302, a brightness difference between average pixel brightness of every two sub-regions is calculated.

At block 303, when brightness differences are all within a preset range, determine to generate one reference image by adjusting the brightness of the original image. For example, the brightness differences are all within a first preset range.

At block 304, when not all the brightness differences are within the preset range, determine to generate two reference images by adjusting brightness of the original image to different degrees. For example, the brightness differences include a first brightness difference within the first preset range and a second brightness difference within a second preset range, where the second brightness difference is greater than the first brightness difference.

By dividing the original image into multiple sub-regions, whether brightness distribution of the original image is uniform can be detected based on the brightness difference between the sub-regions. The first preset range and the second preset range is preset according to a large number of experimental data. When a brightness difference between the average pixel brightness of two sub-regions is within a first preset range, it indicates that brightness of the two sub-regions is relatively close. On the other hand, when the brightness difference between the average pixel brightness of the two sub-regions is not within a first preset range, it indicates that brightness of the two sub-regions is greatly different, that is, variation of the brightness is not gradual. By calculating the brightness difference between average pixel brightness of every two sub-regions, when the brightness differences are all within the first preset range, it indicates that the brightness distribution of the original image is uniform, and determine to generate one reference image by performing brightness adjustment on the original image. When the brightness differences includes the first brightness difference within the first preset range and the second brightness difference within the second preset range, determine to generate multiple reference images by performing brightness adjustment in different levels on the original image, to preserve image details for each region. In one example, sub-region sets corresponding to different brightness levels can be determined according to the brightness differences, and brightness adjustment is performed on regions corresponding to each sub-region set respectively.

Figure 8:
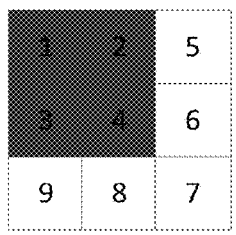
FIG. 8 is a schematic diagram illustrating an application scenario of an eighth method for image processing according to at least one implementation.

For example, as illustrated in FIG. 8, the original image is divided into 9 sub-regions. By calculating brightness differences between sub-regions, the brightness difference between sub-regions 1-4 is different from other sub-regions. Therefore, for the original image, brightness adjustment in different levels are performed on sub-regions 1-4 and other sub-regions respectively, to generate multiple reference images.

In different shooting scenes, the user may desire to capture images of different objects. For example, in portrait mode, the user may prefer to capture the face region more clearly. For another example, in landscape mode, the user may prefer to capture the target building more clearly. Therefore, in order to satisfy personalized demand on shooting, processing is performed based on whether the original image contains a target region that the user may care about its sharpness.

Figure 9:
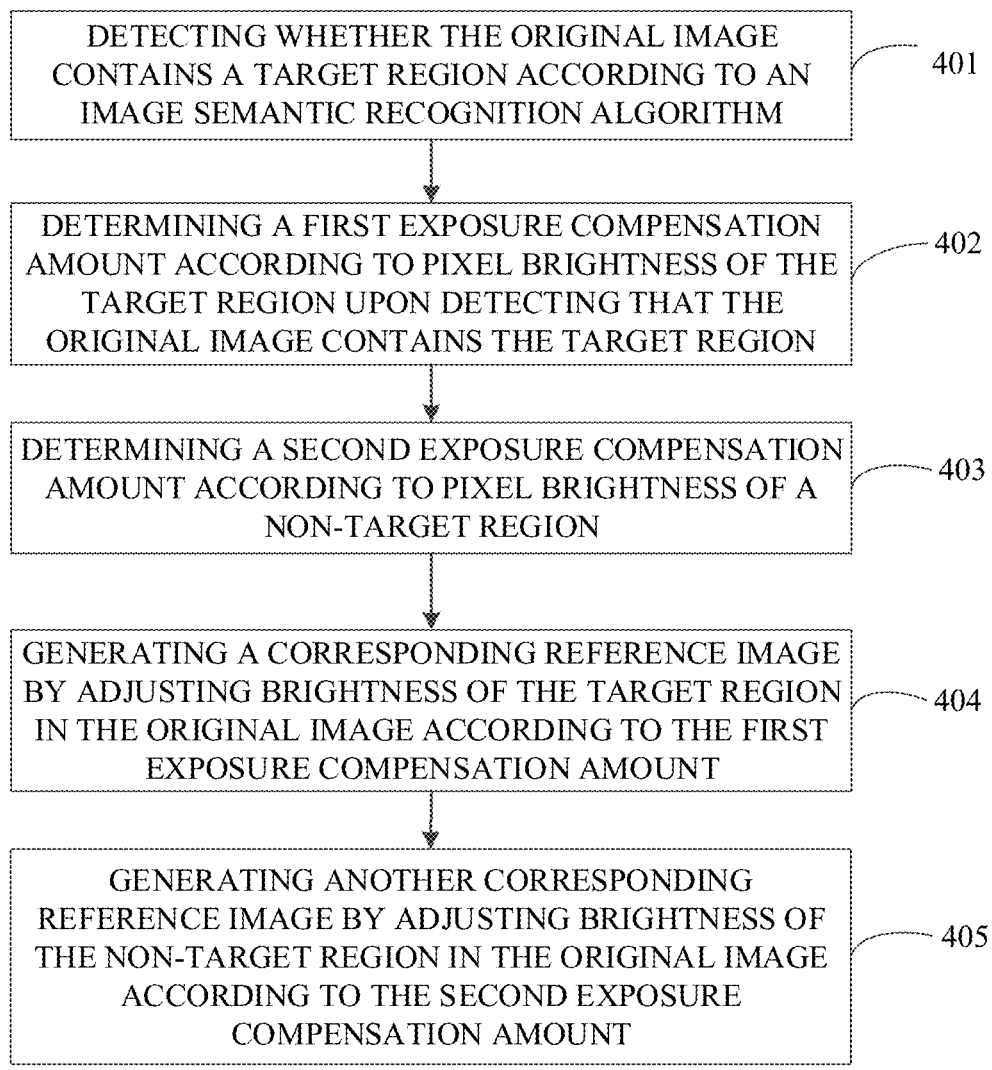
FIG. 9 is a schematic flow chart illustrating another method for image processing according to at least one implementation.

As a third example, as illustrated in FIG. 9, operations at block 102 begin at block 401.

At block 401, whether the original image contains a target region is determined according to an image semantic recognition algorithm.

The target region can be a region where graphics of a user-defined type located, such as face region, famous building region, etc. The target region may also be set by the system according to big data analysis.

When the original image contains the target region, in order to process the target region, the target region, that is, pixel positions are determined.

In at least one implementation, when the original image does not contain the target region, the at least one reference image is generated by adjusting the brightness of the original image as a whole. That is, the original image is considered as a whole without division.

At block 402, when the original image contains the target region, a first exposure compensation amount is determined according to pixel brightness of the target region.

At block 403, a second exposure compensation amount is determined according to pixel brightness of a non-target region.

At block 404, a corresponding reference image is generated by adjusting brightness of the target region in the original image according to the first exposure compensation amount.

At block 405, another corresponding reference image is generated by adjusting brightness of the non-target region in the original image according to the second exposure compensation amount.

In this example, the first exposure compensation amount is determined based on the pixel brightness of the target region. The first exposure compensation amount leads to a good exposure of the target region, which can well recover image details of the target region. For example, when the average pixel brightness of the target region is small, the face region is considered dark, which indicates that the face region in the original image is under-exposed. Therefore, the face region should be brightened, and the first exposure compensation amount increases the initial exposure. Further, the brightness of the target region in the original image is adjusted according to the first exposure compensation amount to generate the corresponding reference image. The first exposure compensation amount can be one or more compensation amounts.

In implementations, the reference image can be generated by simply considering the target region in the original image. As such, details of the target region can be revealed. In order to further improve efficiency of image processing, the non-target region may also be brightened. That is, the second exposure compensation amount is determined according to pixel brightness of the non-target region, and a corresponding reference image is generated by adjusting brightness of the non-target region in the original image according to the second exposure compensation amount. The second exposure compensation amount can be one or more compensation amounts. In this way, every region in the final synthesized image may reveal abundant details. Moreover, while taking image detail revealing of the non-target region into consideration, the number of reference image(s) corresponding to the non-target region can be limited so as to improve the efficiency of image processing.

Figure 10A:
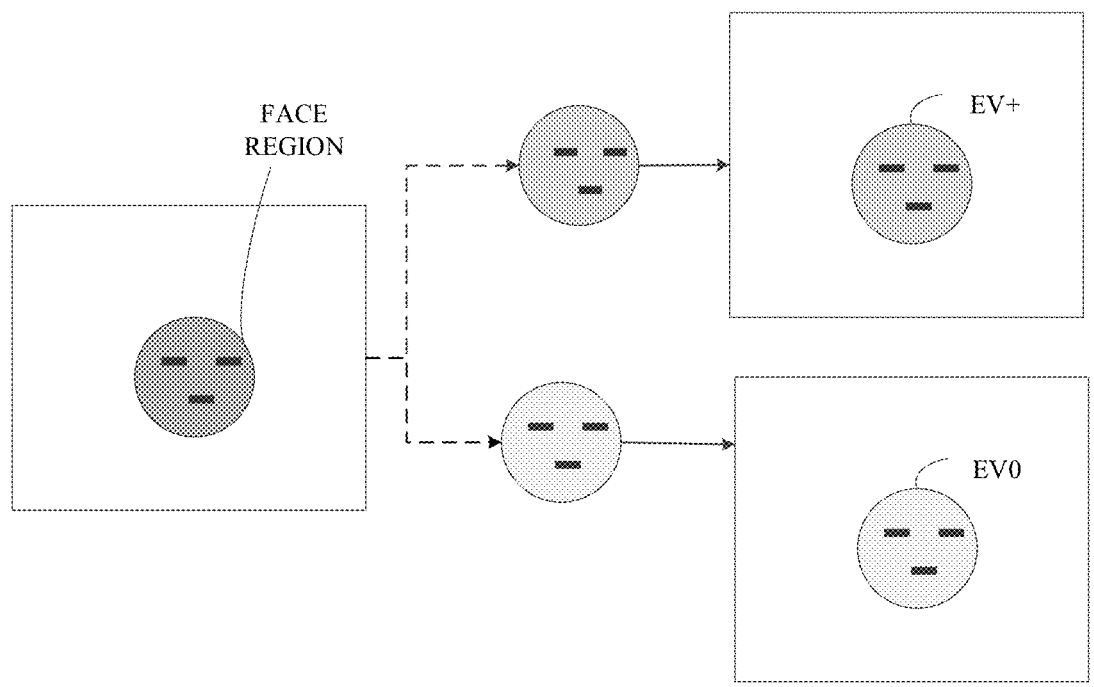
FIG. 10A is a schematic diagram illustrating an application scenario of a ninth method for image processing according to at least one implementation.

For example, as illustrated in FIG. 10A, the target region is a face region, the initial exposure is EV−, and there are two first exposure compensation amounts. Average pixel brightness of the face region can be detected. The average pixel brightness is relatively low, which indicates that the face region is under-exposed. The first exposure compensation amounts can be determined to be EV0 and EV+ based on the average pixel brightness of the face region. In this case, reference images are obtained according to the first exposure compensation amounts based on the face region only. Since only the face region is considered, the efficiency of image processing can be improved and user personalized requirements on image processing can be satisfied.

Figure 10B:
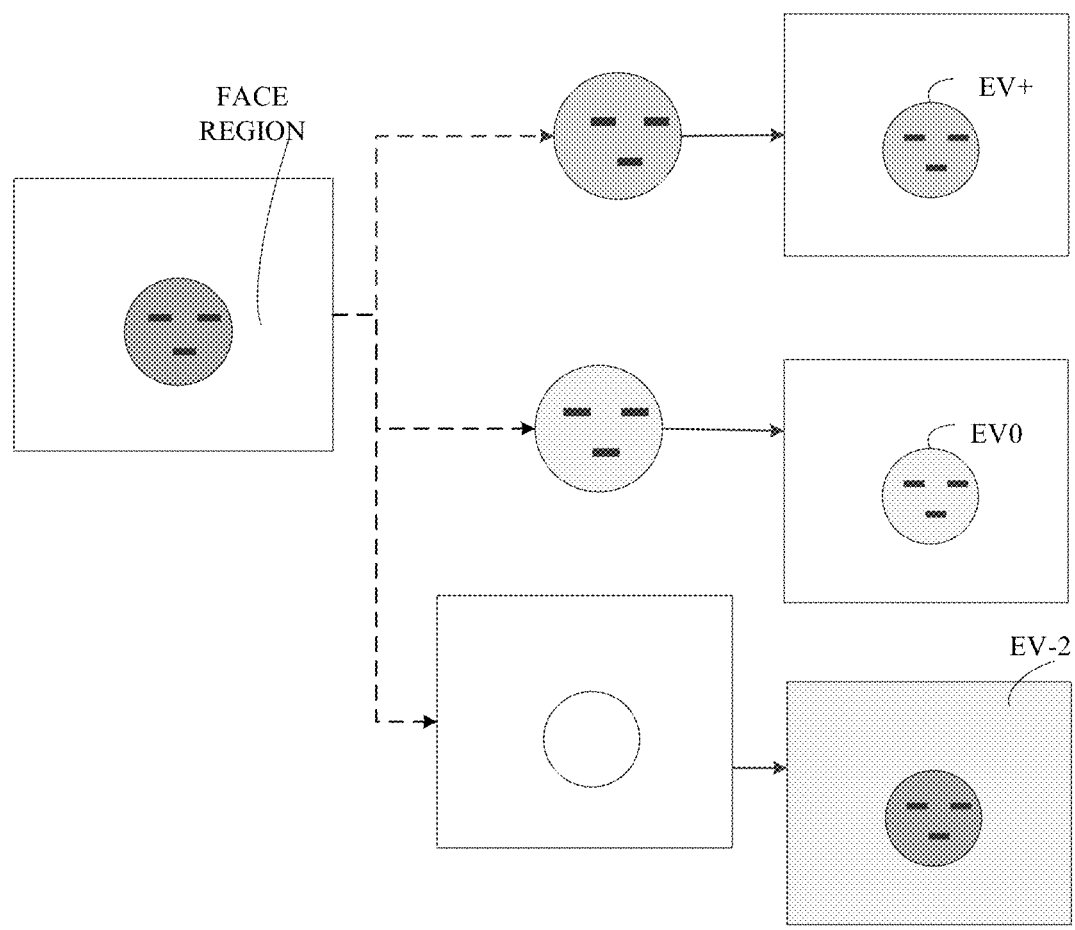
FIG. 10B is a schematic diagram illustrating an application scenario of a tenth method for image processing according to at least one implementation.

For example, as illustrated in FIG. 10B, the target region is a face region, the initial exposure is EV−, and there are two first exposure compensation amounts and one second exposure compensation amount. Average pixel brightness of the face region can be detected. The average pixel brightness is relatively low, which indicates that the face region is under-exposed. The first exposure compensation amounts can be determined to be EV0 and EV+ based on the average pixel brightness of the face region. Further, a non-face region is determined to be relatively bright based on average pixel brightness of the non-face region, which indicates that the non-face region is over-exposed. The second exposure compensation amount can be determined to be EV−2. Reference images are obtained according to the first compensation amounts based on the face region. Therefore, since both the face region and the non-face region are considered and different processing is performed respectively, image details and dynamic information of each region in the final obtained image can be satisfied.

In this example, in order to further satisfy requirements on image quality of the target region, when there are multiple target regions, different first exposure compensation amounts can be obtained for different target regions. For example, when the target regions are face regions, for each face region, a first exposure compensation amount corresponding to the face region can be determined according to average pixel brightness of the face region. Then for each face region, according to the first exposure compensation amount corresponding thereto, adjust brightness of the face region in the original image to obtain a reference image corresponding to the face region.

Figure 10C:
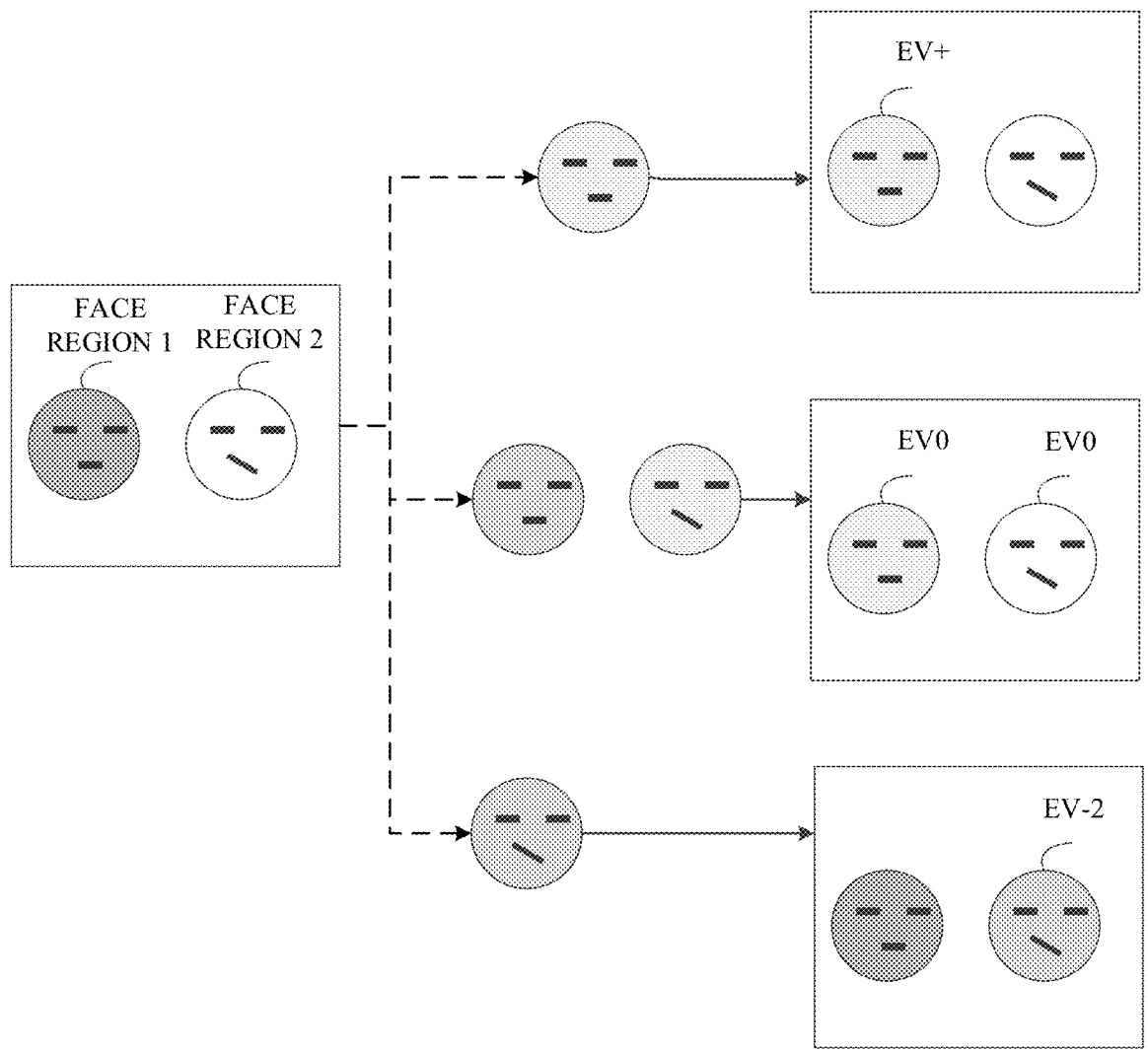
FIG. 10C is a schematic diagram illustrating an application scenario of a eleventh method for image processing according to at least one implementation.

For example, as illustrated in FIG. 10C, the target regions are face regions including face region 1 and face region 2, the initial exposure is EV−, and there are two first exposure compensation amounts. Average pixel brightness of face region 1 can be detected to be relatively low, which indicates that face region 1 is under-exposed (for example, standing in the shadow area). The first exposure compensation amounts of face region 1 can be determined to be EV0 and EV+ based on the average pixel brightness of face region 1. Average pixel brightness of face region 2 can be detected to be relatively high, which indicates that face region 2 is overexposed (for example, standing under the light). The first exposure compensation amounts of face region 2 can be determined to be EV0 and EV−2 based on the average pixel brightness of face region 2. According to the first exposure compensation amounts corresponding to each face region, reference images corresponding to each face region are generated by adjusting brightness of the corresponding face region in the original figure. In this case, since face region 1 and face region 2 have a same first exposure compensation amount EV0, one reference image corresponding to face region 1 and face region 2 can be generated at one time based on the same exposure compensation amount. In this way, compared with a situation where reference images are generated respectively for face region 1 and face region 2 based on the first exposure compensation amount EV0, the imaging speed can be improved.

Figure 10D:
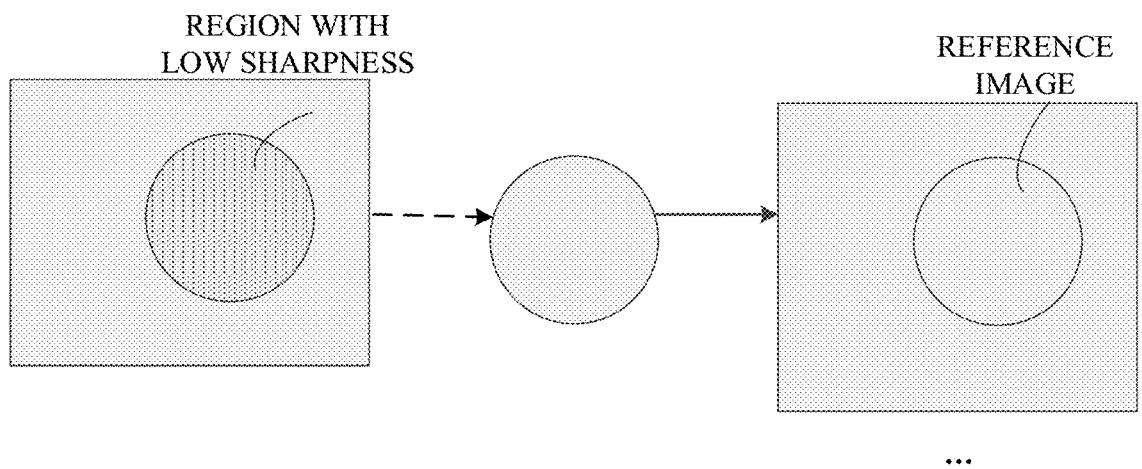
FIG. 10D is a schematic diagram illustrating an application scenario of a twelfth method for image processing according to at least one implementation.

For another example, in order to ensure purity of the whole image, as illustrated in FIG. 10D, there are regions with low sharpness and regions with desired sharpness in the original image. A corresponding reference image is obtained by simply adjusting brightness of the region with low sharpness, so that the efficiency of the image processing can be improved while ensuring the purity of the whole image.

In summary, the method for image processing of the implementations can obtain reference images based on different dimensions and based on requirements on different photographing scenes, which can achieve flexibility in image processing and improve the practicability of image processing.

In order to achieve the implementations above-mentioned, an apparatus for image processing is further provided.

Figure 11:
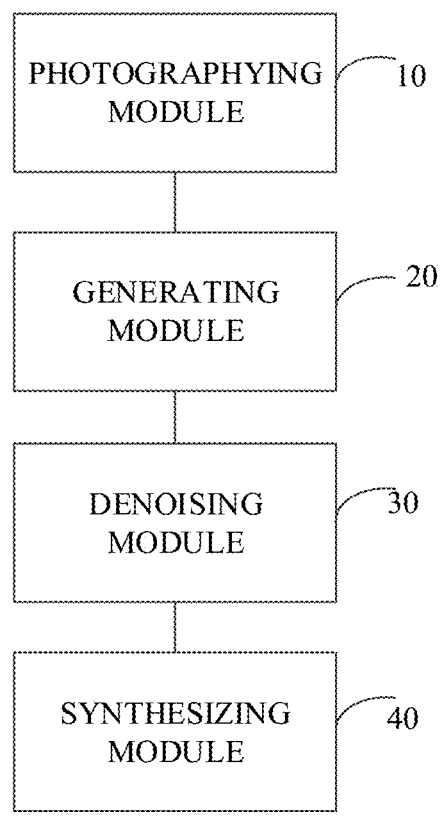
FIG. 11 is a schematic structural diagram illustrating an apparatus for image processing according to a first implementation.

FIG. 11 is a schematic structural diagram illustrating an apparatus for image processing according to a first implementation. As illustrated in FIG. 11, the apparatus for image processing includes a photographing module 10, a generating module 20, a denoising module 30, and a synthesizing module 40. The photographing module 10 can be an image processor. The generating module 20 and the denoising module 30 can be integrated into a graphic processing unit (GPU). The synthesizing module 40 can be implemented with an image signal processing (ISP) processor.

The photographing module 10 is configured to obtain an original image.

The generating module 20 is configured to generate at least one reference image by adjusting brightness of the original image.

The denoising module 30 is configured to generate multiple denoised images by performing AI-based denoising on the original image and the at least one reference image respectively.

The synthesizing module 40 is configured to generate a target image by performing HDR synthesis on the multiple denoised images.

Figure 12:
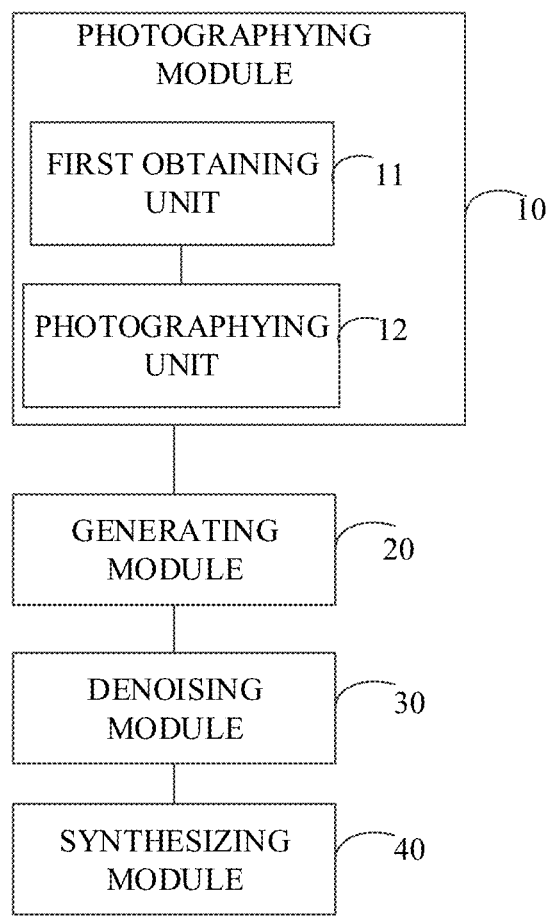
FIG. 12 is a schematic structural diagram illustrating an apparatus for image processing according to a second implementation.

As an example, on the basis of FIG. 11, as illustrated in FIG. 12, the photographing module 10 includes a first obtaining unit 11 and a photographing unit 12.

The first obtaining unit 11 is configured to obtain an ambient light intensity.

The photographing unit 12 is configured to determine an initial exposure according to the ambient light intensity and capture the original image according to the initial exposure.

As an example, the photographing unit 12 is configured to determine the initial exposure as a first exposure when the ambient light intensity is lower than or equal to a first threshold intensity. The photographing unit 12 is further configured to determine the initial exposure as a second exposure when the ambient light intensity is higher than the first threshold intensity and lower than or equal to a second threshold intensity. The photographing unit 12 is still further configured to determine the initial exposure as a third exposure when the ambient light intensity is higher than the second threshold intensity, where the first exposure is smaller than the second exposure, and the second exposure is smaller than the third exposure.

Figure 13:
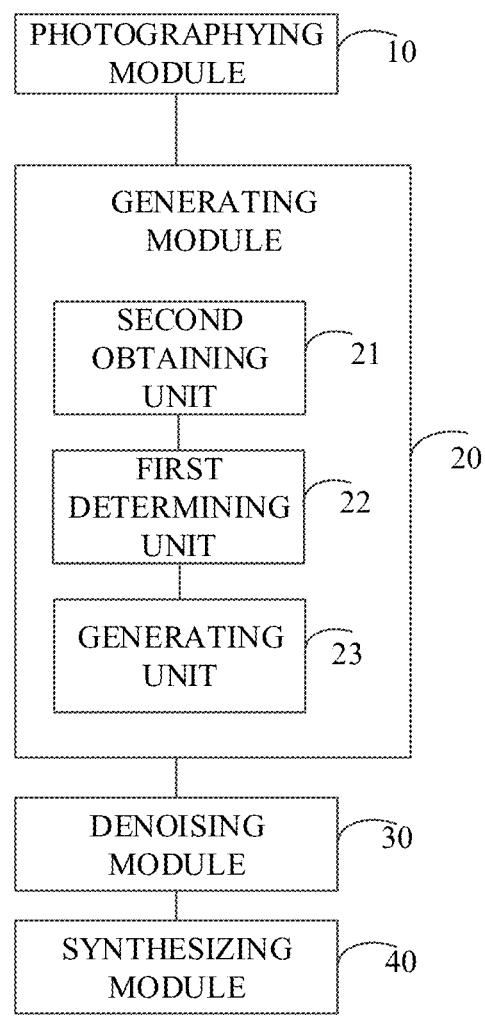
FIG. 13 is a schematic structural diagram illustrating an apparatus for image processing according to a third implementation.

As an example, on the basis of FIG. 11, as illustrated in FIG. 13, the generating module 20 includes a second obtaining unit 21, a first determining unit 22, and a generating unit 23.

The second obtaining unit 21 is configured to obtain average pixel brightness of the original image.

The first determining unit 22 is configured to determine at least one exposure compensation amount according to the average pixel brightness.

The generating unit 23 is configured to generate the at least one reference image by adjusting the brightness of the original image according to the at least one exposure compensation amount respectively.

As an example, the first determining unit 22 is configured to input the original image into multiple brightening models corresponding to each of the at least one exposure compensation amount.

Figure 14:
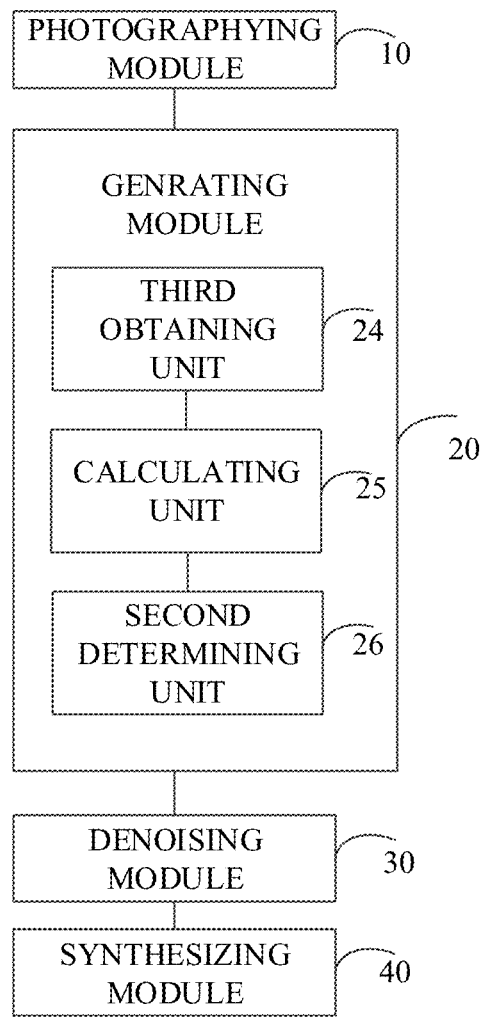
FIG. 14 is a schematic structural diagram illustrating an apparatus for image processing according to a fourth implementation.

As an example, on the basis of FIG. 11, as illustrated in FIG. 14, the generating module 20 includes a third obtaining unit 24, a calculating unit 25, and a second determining unit 26.

The third obtaining unit 24 is configured to divide the original image into multiple sub-regions and obtain average pixel brightness of each of the sub-regions.

The calculating unit 25 is configured to determine to generate one reference image by adjusting the brightness of the original image when brightness differences are all within a first preset range.

The second determining unit 26 is configured to determine to generate multiple reference images by adjusting brightness of the original image to different degrees when the brightness differences include a first brightness difference within the first preset range and a second brightness difference within a second preset range, where the second brightness difference is greater than the first brightness difference.

Figure 15:
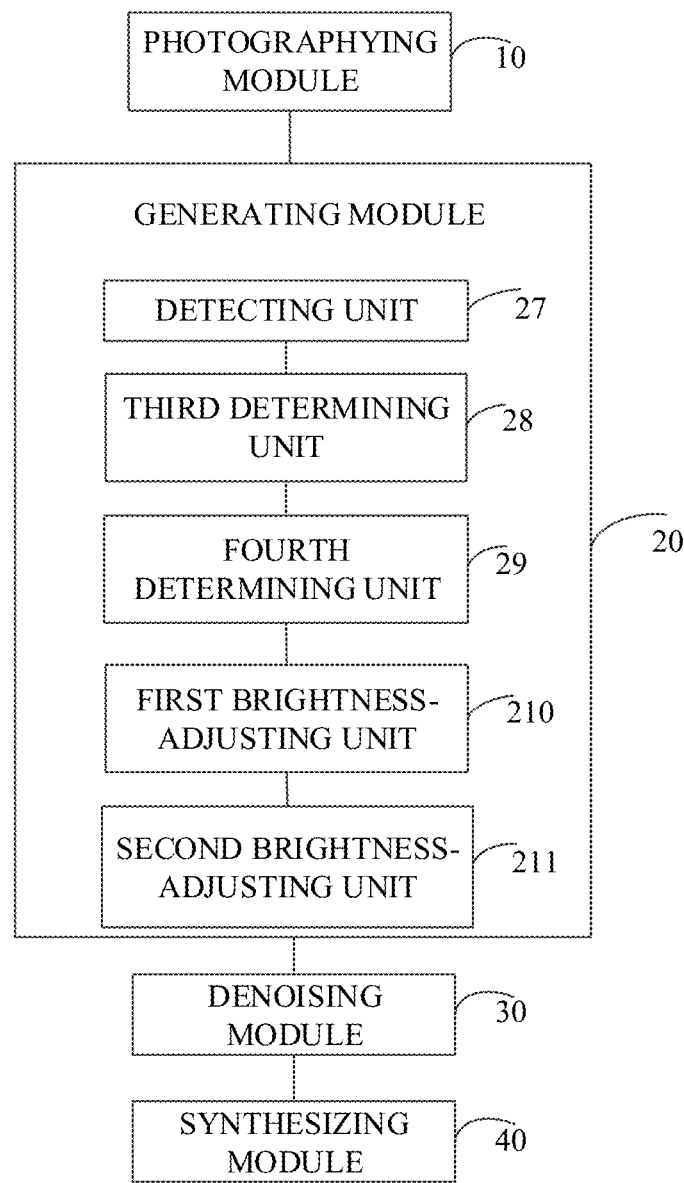
FIG. 15 is a schematic structural diagram illustrating an apparatus for image processing according to a fifth implementation.

As an example, as illustrated in FIG. 15, on the basis of FIG. 11, the generating module 20 includes a detecting unit 27, a third determining unit 28, a fourth determining unit 29, a first brightness-adjusting unit 210, and a second brightness-adjusting unit 211.

The detecting unit 27 is configured to determine, according to an image semantic recognition algorithm, whether the original image contains a target region.

The third determining unit 28 is configured to determine a first exposure compensation amount according to pixel brightness of the target region upon detecting that the original image contains the target region.

The fourth determining unit 29 is configured to determine a second exposure compensation amount according to pixel brightness of a non-target region.

The first brightness-adjusting unit 210 is configured to generate a corresponding reference image by adjusting brightness of the target region in the original image according to the first exposure compensation amount.

The second brightness-adjusting unit 211 is configured to generate another corresponding reference image by adjusting brightness of the non-target region in the original image according to the second exposure compensation amount.

Figure 16:
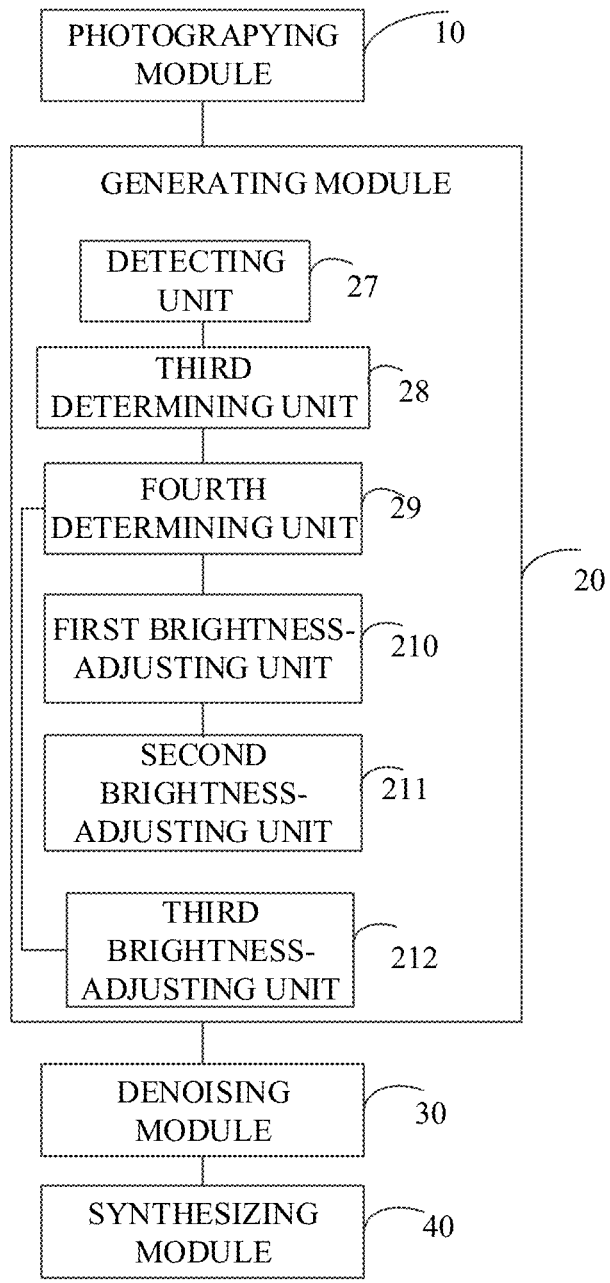
FIG. 16 is a schematic structural diagram illustrating an apparatus for image processing according to a sixth implementation.

As an example, on the basis of FIG. 15, as illustrated in FIG. 16, the generating module 20 includes a third brightness-adjusting unit 212. The third brightness-adjusting unit 212 is configured to generate the at least one reference image by adjusting the brightness of the original image as a whole upon detecting that the original image does not contain the target region.

Figure 17:
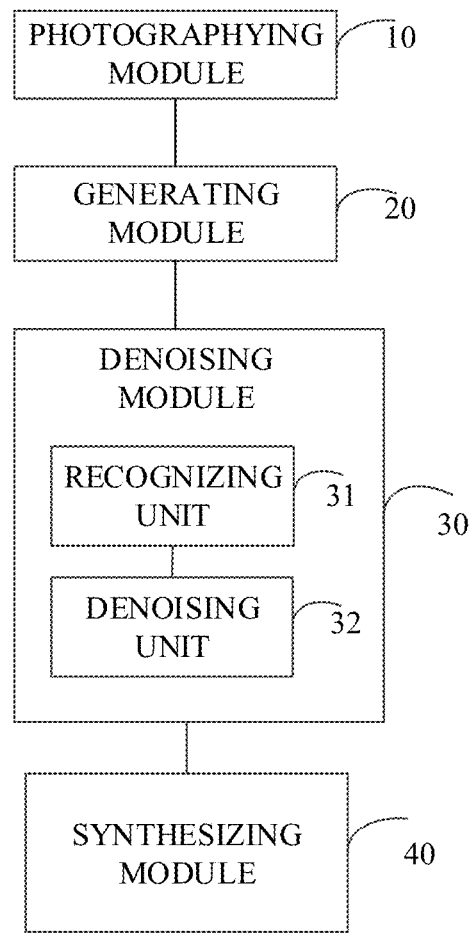
FIG. 17 is a schematic structural diagram illustrating an apparatus for image processing according to a seventh implementation.

As an example, on the basis of FIG. 11, as illustrated in FIG. 17, the denoising module 30 includes a recognizing unit 31 and a denoising unit 32.

The recognizing unit 31 is configured to recognize, with a neural network model, noise characteristic of the original image and the at least one reference image respectively, where the neural network model has learned a mapping relationship between sensitivity and noise characteristic, specifically, sensitivity and noise characteristic of the original image and the at least one reference images.

The denoising unit 32 is configured to obtain the multiple denoised images by denoising the original image and the at least one reference images according to a recognized noise characteristic.

As an example, the neural network model is trained using sample images with different sensitivity until a noise characteristic recognized by the neural network model matches a noise characteristic identified in a corresponding sample image.

Figure 18:
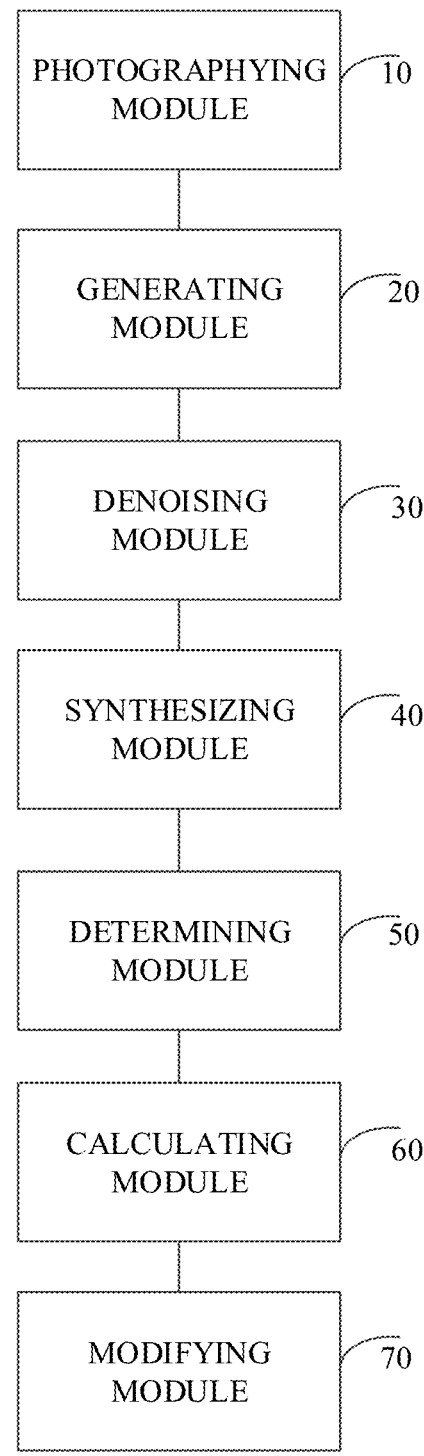
FIG. 18 is a schematic structural diagram illustrating an apparatus for image processing according to an eighth implementation.

As an example, on the basis of FIG. 11, as illustrated in FIG. 18, the apparatus further includes a determining module 50, a calculating module 60, and a modifying module 70.

The determining module 50 is configured to determine multiple reference pixels in the target image.

The calculating module 60 is configured to calculate a difference of pixel grayscale between the multiple reference pixels according to a preset gradient function.

The modifying module 70 is configured to modify a corresponding parameter of the neural network model when the difference of pixel grayscale is greater than a preset threshold.

Figure 19:
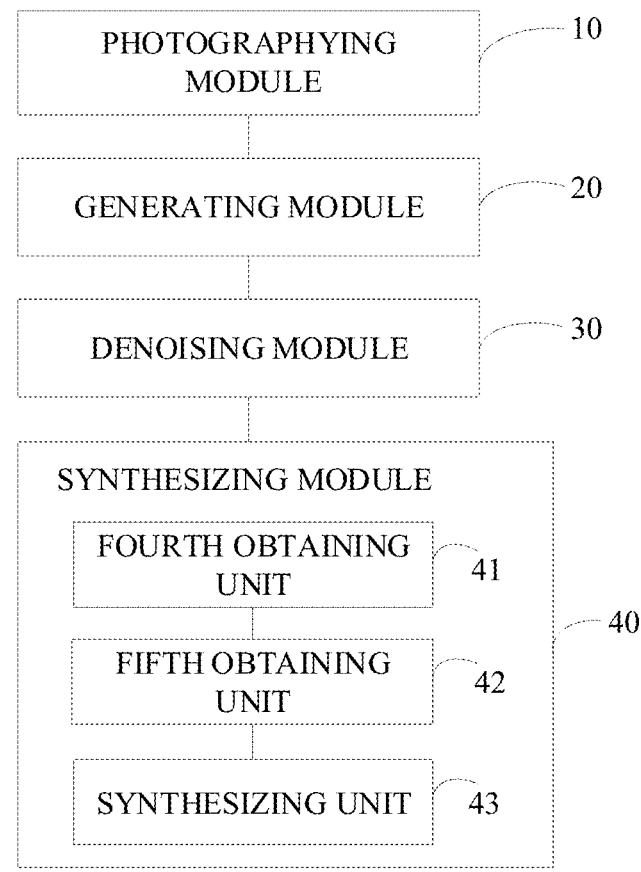
FIG. 19 is a schematic structural diagram illustrating an apparatus for image processing according to a ninth implementation.

As an example, on the basis of FIG. 11, as illustrated in FIG. 19, the synthesizing module 40 includes a fourth obtaining unit 41, a fifth obtaining unit 42, and a synthesizing unit 43.

The fourth obtaining unit 41 is configured to input the multiple denoised images into an HDR synthesis model.

The fifth obtaining unit 42 is configured to obtain synthesis weights for respective regions of the original image, where the HDR model has learned a mapping relationship between characteristic and the synthesis weight of each region, and the characteristic is indicative of exposure and brightness of a corresponding image region.

The synthesizing unit 43 is configured to generate the target image by synthesizing the multiple denoised images per region according to the synthesis weights.

It should be noted that the above description of the method for image processing is also applicable to the apparatus for image processing of the implementations, and the similar principle for implementation will not be repeated herein.

In summary, according to the apparatus for image processing, the original image is captured. The at least one reference image is generated by adjusting brightness of the original image. The multiple denoised images are generated by performing AI-based denoising on the original image and the at least one reference image respectively. Further, the target image is generated by performing HDR synthesis on the multiple denoised images. In this way, by using the AI-based denoising, the image purity can be guaranteed and more image details can be preserved. Moreover, since the images used for synthesis are all derived from the original image, the ghosting effect in the synthesized target image due to misalignment can be avoided. Additionally, the reference image is obtained by adjusting brightness of the original image rather than shooting, so that imaging efficiency of the target image can be improved.

Figure 20:
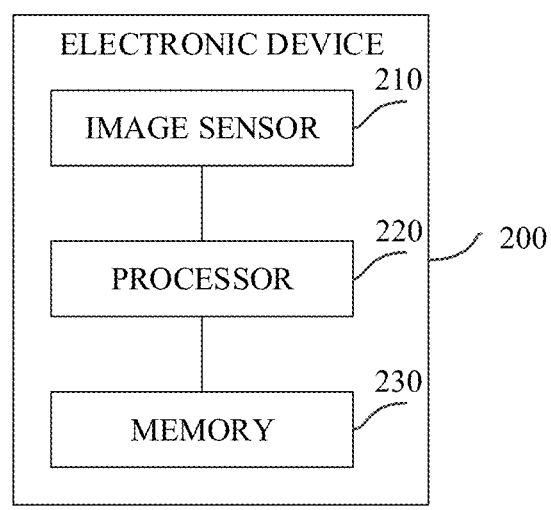
FIG. 20 is a schematic structural diagram illustrating an electronic device according to at least one implementation.

In order to achieve the implementations above, an electronic device 200 is further provided. As illustrated in FIG. 20, the electronic device 200 includes an image sensor 210, a processor 220, a memory 230, where the memory 230 is configured to store computer programs which are executable on the processor 220. The image sensor 210 is electrically coupled with the processor 220. When the processor 220 executes the computer programs, the processor 220 executes the method for image processing as set out in the above implementations.

In at least one implementation, the processor 220 includes an image signal processing (ISP) processor. The ISP processor is configured to control the image sensor to obtain the original image, and to generate the target image by performing the HDR synthesis on the multiple denoised images, which correspond to the original image and at least one reference image.

In at least one implementation, the processor 220 also includes a graphic processing unit (GPU) coupled with the ISP processor. The GPU is configured to generate the multiple denoised images by performing AI-based denoising on the original image and the at least one reference image respectively.

Figure 21:
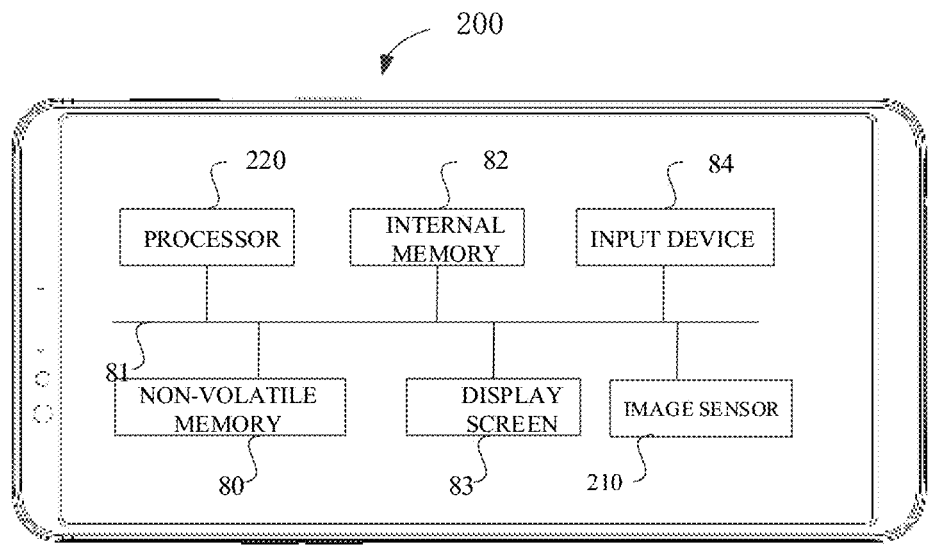
FIG. 21 is a schematic diagram illustrating an electronic device according to at least one implementation.

As an example, on the basis of the electronic device of FIG. 20, FIG. 21 illustrates an electronic device according to at least one implementation. The memory 230 of the electronic device 200 includes a non-volatile memory 80, an internal memory 82, and a processor 220. The memory 230 is configured to store computer-readable instructions. When executed by the processor 230, the computer-readable instructions cause the processor 230 to implement the method for image processing of any of the above implementations.

As illustrated in FIG. 21, the electronic device 200 includes a processor 220, a non-volatile memory 80, an internal memory 82, a display screen 83, and an input device 84 connected via a system bus 81. The non-volatile memory 80 of the electronic device 200 stores an operating system and computer-readable instructions. The computer-readable instructions can be executed by the processor 220 to implement the method for image processing in the implementations. The processor 220 is configured to provide computing and control capabilities to support operation of the entire electronic device 200. The internal memory 82 of the electronic device 200 provides an environment for execution of computer-readable instructions in the non-volatile memory 80. The display screen 83 of the electronic device 200 can be a liquid crystal display or an electronic ink display. The input device 84 can be a touch layer covered on the display screen 83, or can be a button, a trackball, or a touchpad provided on the housing of the electronic device 200, or can be an external keyboard, touchpad, or mouse. The electronic device 200 can be a mobile phone, a tablet PC, a laptop, a personal digital assistant (PDA), or a wearable device (such as a smart bracelet, a smart watch, a smart helmet, and smart glasses). Those skilled in the art may understand that the structure shown in FIG. 21 is merely a schematic diagram of a part of the structure related to the solution of the disclosure, and does not constitute any limitation on the electronic device 200 to which the solution of the disclosure is applied. The electronic device 200 may include more or fewer components than illustrated, combine certain components, or have different component configuration.

Figure 22:
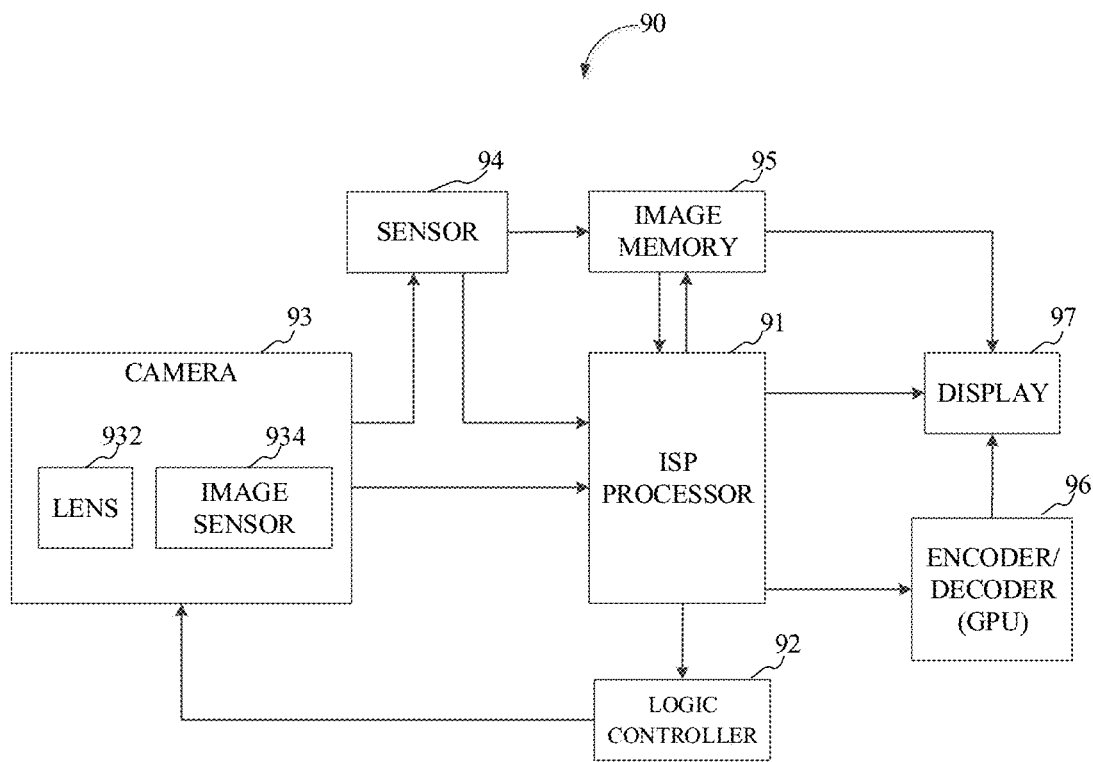
FIG. 22 is a schematic diagram illustrating an image processing circuit according to at least one implementation.

In order to achieve the implementations above, the present disclosure further provides an image processing circuit. FIG. 22 is a schematic diagram illustrating an image processing circuit according to at least one implementation. As illustrated in FIG. 22, the image processing circuit 90 includes an ISP processor 91 (the ISP processor 91 is used as the processor 220) and a GPU.

The ISP processor 91 is electrically coupled with an image sensor and is configured to control the image sensor to obtain an original image, and is configured to generate a target image by performing HDR synthesis on multiple denoised images corresponding to the original image and at least one reference image.

The GPU is electrically coupled with the ISP processor 91 and is configured to generate the multiple denoised images by performing AI-based denoising on the original image and the at least one reference image respectively.

Image data captured by a camera 93 is first processed by the ISP processor 91. The ISP processor 91 may analyze the image data to obtain image statistical information that can be used to determine one or more control parameters of the camera 93. A camera module 310 may include one or more lenses 932 and an image sensor 934. The image sensor 934 may include a color filter array (such as a Bayer filter). The image sensor 934 may obtain a light intensity and wavelength information captured by each imaging pixel, and provide a set of raw image data that can be processed by the ISP processor 91. A sensor 94 (such as a gyro-sensor) may provide parameters (such as anti-shake parameters) acquired for image processing to the ISP processor 91 based on the type of the interface of the sensor 94. An interface of the sensor 94 can be a standard mobile imaging architecture (SMIA) interface, other serial or parallel camera interfaces, or a combination of thereof.

In addition, the image sensor 934 is configured to send the original image data to the sensor 94. The sensor 94 is also configured to provide the raw image data to the ISP processor 91 based on the type of the interface of the sensor 94, or store the raw image data into an image memory 95.

The ISP processor 91 may process the raw image data pixel by pixel in a variety of formats. For example, each image pixel may have a bit depth of 8, 10, 12, or 14 bits. The ISP processor 91 may perform one or more image processing operations on the raw image data and collect statistical information about the image data. The image processing operations can be performed with the same or different bit depth accuracy.

The ISP processor 91 may also receive image data from the image memory 95. For example, the sensor 94 sends the raw image data to the image memory 95 via an interface, and the raw image data in the image memory 95 is then provided to the ISP processor 91 for processing. The image memory 95 can be a memory 330, a part of the memory 330, a storage device, or a separate dedicated memory in the electronic device, and may have a direct memory access (DMA) feature.

When receiving raw image data from the interface of the image sensor 934 or from the interface of the sensor 94 or from the image memory 95, the ISP processor 91 may perform one or more image processing operations, such as time-domain filtering. The processed image data can be sent to the image memory 95 for further processing before display. The ISP processor 91 may receive the processed data from the image memory 95, and perform image data processing in the original domain and in the RGB and YCbCr color spaces. The image data processed by the ISP processor 91 can be output to a display 97 (the display 97 may include a display screen 83) for viewing by a user and/or further processing by a graphics engine or GPU. In addition, the output of the ISP processor 91 may also be sent to the image memory 95, and the display 97 may read image data from the image memory 95. In one example, the image memory 95 can be configured to implement one or more frame buffers. In addition, the output of the ISP processor 91 can be sent to an encoder/decoder 96 to encode/decode the image data. The encoded image data can be saved and then decompressed before being displayed on the display 97. The encoder/decoder 96 can be implemented by a CPU or a GPU or a coprocessor.

The statistical data determined by the ISP processor 91 can be sent to a control logic unit 92. For example, the statistical data may include statistical information of the image sensor 934 such as auto exposure, auto white balance, auto focus, flicker detection, black level compensation, and shading correction for lens 932. The control logic 92 may include a processing element and/or a microcontroller that executes one or more routines (such as firmware). The one or more routines may determine control parameters of the camera 93 and control parameters of the ISP processor 91 according to the received statistical data. For example, the control parameters of the camera 93 may include control parameters of the sensor 94 (such as gain, integration time for exposure control, anti-shake parameters, etc.), camera flash control parameters, control parameters of the lens 932 (such as focal distance for focusing or zooming), or a combination thereof. The ISP control parameters may include gain levels and color correction matrices for automatic white balance and color adjustment (e.g., during RGB processing), and shading correction parameters for lens 932.

Using the technology of image processing illustrated in FIG. 22, a method for image processing can be achieved as follows. An original image is captured. At least one reference image is generated by adjusting brightness of the original image. Multiple denoised images are generated by performing AI-based denoising on the original image and the at least one reference image respectively. A target image is generated by performing HDR synthesis on the multiple denoised images.

In order to achieve implementations above-mentioned, the implementations further provide a storage medium. When executed by a processor, instructions in the storage medium cause the processor to execute the following method. An original image is captured. At least one reference image is generated by adjusting brightness of the original image. Multiple denoised images are generated by performing AI-based denoising on the original image and the at least one reference image respectively. A target image is generated by performing HDR synthesis on the multiple denoised images.

A person of ordinary skill in the art may understand that all or part of processes in the methods of the foregoing implementations can be implemented by using computer programs to instruct related hardware. The programs can be stored in a non-volatile computer-readable storage medium. When the programs is executed, it may perform the processes of the implementations of the methods described above. The storage medium can be a magnetic disk, an optical disk, a read-only memory (ROM), and the like.

The above-mentioned implementations only express several implementation manners of the present disclosure, descriptions of which are more specific and detailed, but cannot be understood as limiting the scope of the present disclosure. It should be noted that, for those of ordinary skill in the art, without departing from the concept of the present disclosure, several modifications and improvements can be made, which all belong to the protection scope of the present disclosure. Therefore, the protection scope of this disclosure shall be subject to the appended claims.

What is claimed is:

1. A method for image processing, comprising:
   capturing an original image;
   generating at least one reference image by adjusting brightness of the original image;
   generating a plurality of denoised images by performing artificial intelligence-based (AI-based) denoising on the original image and the at least one reference image respectively; and
   generating a target image by performing high dynamic range (HDR) synthesis on the plurality of denoised images,
   wherein generating the at least one reference image by adjusting the brightness of the original image comprises:
      dividing the original image into a plurality of sub-regions and obtaining average pixel brightness of each of the sub-regions;
      calculating a brightness difference between average pixel brightness of every two sub-regions;
      determining to generate one reference image by adjusting the brightness of the original image, when brightness differences are all within a preset range; and
      determining to generate a plurality of reference images by adjusting brightness of different regions in the original image to different degrees, when not all the brightness differences are within the preset range.

2. The method of claim 1, wherein capturing the original image comprises:
   obtaining an ambient light intensity;
   determining an initial exposure according to the ambient light intensity; and
   capturing the original image according to the initial exposure.

3. The method of claim 2, wherein determining the initial exposure according to the ambient light intensity comprises:
   determining the initial exposure as a first exposure when the ambient light intensity is lower than or equal to a first threshold intensity;
   determining the initial exposure as a second exposure when the ambient light intensity is higher than the first threshold intensity and lower than or equal to a second threshold intensity; and
   determining the initial exposure as a third exposure when the ambient light intensity is higher than the second threshold intensity,
   wherein the first exposure is smaller than the second exposure, and the second exposure is smaller than the third exposure.

4. The method of claim 2, wherein determining the initial exposure according to the ambient light intensity comprises:
   capturing a preview image;
   detecting whether the preview image contains a face region;
   determining a portrait mode according to the ambient light intensity upon detecting that the preview image contains the face region; and
   determining a value of exposure adjustment according to the portrait mode and adjusting the initial exposure according to the value of exposure adjustment.

5. The method of claim 1, wherein generating the at least one reference image by adjusting the brightness of the original image comprises:
   obtaining average pixel brightness of the original image;
   determining at least one exposure compensation amount according to the average pixel brightness; and
   generating the at least one reference image by adjusting the brightness of the original image according to the at least one exposure compensation amount respectively.

6. The method of claim 5, wherein generating the at least one reference image by adjusting the brightness of the original image according to the at least one exposure compensation amount respectively comprises:
   generating the at least one reference image by inputting the original image into a plurality of brightening models respectively, wherein each of the plurality of brightening models corresponds to each of the at least one exposure compensation amount and is configured to adjust the brightness of the original image according to pixel brightness of the original image and the exposure compensation amount.

7. The method of claim 1, wherein generating the at least one reference image by adjusting the brightness of the original image comprises:
   detecting whether the original image contains a target region according to an image semantic recognition algorithm;
   determining a first exposure compensation amount according to pixel brightness of the target region upon detecting that the original image contains the target region;
   determining a second exposure compensation amount according to pixel brightness of a non-target region;
   generating a corresponding reference image by adjusting brightness of the target region in the original image according to the first exposure compensation amount; and
   generating another corresponding reference image by adjusting brightness of the non-target region in the original image according to the second exposure compensation amount.

8. The method of claim 7, wherein the target region comprises a plurality of face regions, and wherein:
   determining the first exposure compensation amount according to the pixel brightness of the target region comprises:
      for each of the plurality of face regions, determining a first exposure compensation amount corresponding to the face region according to average pixel brightness of the face region; and
   generating the corresponding reference image by adjusting the brightness of the target region in the original image according to the first exposure compensation amount comprises:
      for each of the plurality of face regions, generating the reference image corresponding to the face region by adjusting brightness of the face region in the original image according to the first exposure compensation amount corresponding to the face region.

9. The method of claim 7, further comprising:
generating the at least one reference image by adjusting the brightness of the original image as a whole upon detecting that the original image does not contain the target region.

10. The method of claim 1, wherein generating the plurality of denoised images by performing the AI-based denoising on the original image and the at least one reference image respectively comprises:
performing, with a neural network model, noise characteristic recognition on the original image and the at least one reference image respectively, wherein the neural network model has learned a mapping relationship between sensitivity and noise characteristic of the original image and the at least one reference image; and
obtaining the plurality of denoised images by performing denoising on the original image and the at least one reference image respectively according to a recognized noise characteristic.

11. The method of claim 10, wherein the neural network model is trained using sample images corresponding to different sensitivity until a noise characteristic recognized by the neural network model matches a noise characteristic identified in a corresponding sample image.

12. The method of claim 11, further comprising:
determining a plurality of reference pixels in the target image;
calculating a difference of pixel grayscale between the plurality of reference pixels according to a preset gradient function; and
modifying a corresponding parameter of the neural network model when the difference of pixel grayscale is greater than a preset threshold.

13. The method of claim 1, wherein generating the target image by performing the HDR synthesis on the plurality of denoised images comprises:
inputting the plurality of denoised images into an HDR synthesis model and obtaining synthesis weights for respective regions of the original image, wherein the HDR synthesis model has learned a mapping relationship between characteristics of the respective regions and the synthesis weights, and wherein the characteristic is indicative of exposure and brightness of corresponding image regions; and
generating the target image by performing the HDR synthesis on the plurality of denoised images per region according to the synthesis weights.

14. An electronic device, comprising
an image sensor;
a processor comprising an image signal processing (ISP) processor and a graphic processing unit (GPU) coupled with the ISP; processor; and
a memory configured to store computer programs which, when executed by the processor, are operable to:
capture, with the image sensor under control of the ISP processor, an original image;
generate, with the GPU, at least one reference image by adjusting brightness of the original image;
generate, with the GPU, a plurality of denoised images by performing artificial intelligence-based (AI-based) denoising on the original image and the at least one reference image respectively; and
generate, with the ISP processor, a target image by performing high dynamic range (HDR) synthesis on the plurality of denoised images,
wherein to generate the at least one reference image by adjusting the brightness of the original image comprises to:
divide the original image into a plurality of sub-regions and obtain average pixel brightness of each of the sub-regions;
calculate a brightness difference between average pixel brightness of every two sub-regions;
determine to generate one reference image by adjusting the brightness of the original image, when brightness differences are all within a preset range; and
determine to generate a plurality of reference images by adjusting brightness of different regions in the original image to different degrees, when not all the brightness differences are within the preset range.

15. The electronic device of claim 14, wherein the GPU configured to generate the at least one reference image by adjusting brightness of the original image is configured to:
obtain average pixel brightness of the original image;
determine at least one exposure compensation amount according to the average pixel brightness; and
generate the at least one reference image by adjusting the brightness of the original image according to the at least one exposure compensation amount respectively.

16. The electronic device of claim 14, wherein the GPU configured to generate the at least one reference image by adjusting brightness of the original image is configured to:
detect whether the original image contains a target region according to an image semantic recognition algorithm;
determine a first exposure compensation amount according to pixel brightness of the target region upon detecting that the original image contains the target region;
determine a second exposure compensation amount according to pixel brightness of a non-target region;
generate a corresponding reference image by adjusting brightness of the target region in the original image according to the first exposure compensation amount; and
generate another corresponding reference image by adjusting brightness of the non-target region in the original image according to the second exposure compensation amount.

17. The electronic device of claim 16, wherein the target region comprises a plurality of face regions, and wherein:
the GPU configured to determine the first exposure compensation amount according to the pixel brightness of the target region is configured to:
for each of the plurality of face regions, determining a first exposure compensation amount corresponding to the face region according to average pixel brightness of the face region; and
the GPU configured to generate the corresponding reference image by adjusting the brightness of the target region in the original image according to the first exposure compensation amount is configured to:
for each of the plurality of face regions, generating the reference image corresponding to the face region by adjusting brightness of the face region in the original image according to the first exposure compensation amount corresponding to the face region.

18. An image processing circuit, comprising
an image signal processing (ISP) processor electrically coupled with an image sensor and configured to control the image sensor to capture an original image and generate a target image by performing high dynamic range (HDR) synthesis on a plurality of denoised images corresponding to the original image and at least one reference image; and a graphic processing unit (GPU) electrically coupled with the ISP processor and configured to generate the plurality of denoised images by performing artificial intelligence-based (AI-based) denoising on the original image and the at least one reference image respectively, wherein the GPU is further configured to:
  divide the original image into a plurality of sub-regions and obtain average pixel brightness of each of the sub-regions;
  calculate a brightness difference between average pixel brightness of every two sub-regions;
  determine to generate one reference image by adjusting the brightness of the original image, when brightness differences are all within a preset range; and
  determine to generate a plurality of reference images by adjusting brightness of different regions in the original image to different degrees, when not all the brightness differences are within the preset range.

\* \* \* \* \*